United States Patent [19]

Bahn

[11] Patent Number: 5,619,113
[45] Date of Patent: Apr. 8, 1997

[54] RELUCTANCE-TYPE MOTOR

[75] Inventor: Itsuki Bahn, Nerima-ku, Japan

[73] Assignee: Kabushikigaisha Sekogiken, Tokyo, Japan

[21] Appl. No.: 403,692

[22] PCT Filed: Dec. 24, 1993

[86] PCT No.: PCT/JP93/01879

§ 371 Date: Jun. 8, 1995

§ 102(e) Date: Jun. 8, 1995

[87] PCT Pub. No.: WO95/02922

PCT Pub. Date: Jan. 26, 1995

[30] Foreign Application Priority Data

| Jul. 16, 1993 | [JP] | Japan | 5-222877 |
| Jul. 27, 1993 | [JP] | Japan | 5-226302 |

[51] Int. Cl.⁶ .................................................. H02P 7/00
[52] U.S. Cl. ........................................ 318/701; 318/254
[58] Field of Search ............................ 318/254, 138, 318/439, 701; 310/166, 261, 68 R, 168, 68 B, 173, 179, 180

[56] References Cited

U.S. PATENT DOCUMENTS

| 3,980,933 | 9/1976 | Piatkowski, Jr. | 318/138 |
| 4,684,867 | 8/1987 | Miller et al. | 318/701 |
| 5,075,610 | 12/1991 | Harris . | |
| 5,115,181 | 5/1992 | Sood | 318/701 |
| 5,223,779 | 6/1993 | Palaniappan | 318/701 |
| 5,278,482 | 1/1994 | Bahn | 318/701 |
| 5,341,076 | 8/1994 | Bahn | 318/254 |
| 5,485,047 | 1/1996 | Bahn | 310/166 |

FOREIGN PATENT DOCUMENTS

| 511398 | 11/1992 | European Pat. Off. . |
| 4-117195 | 4/1992 | Japan . |
| 4-183294 | 6/1992 | Japan . |

*Primary Examiner*—Jonathan Wysocki
*Attorney, Agent, or Firm*—Staas & Halsey

[57] ABSTRACT

An object of the present invention is to obtain a reluctance-type motor which generates small vibration, rotates at a high speed, generates a large output torque, and provides a flattened torque characteristics. A rotor is provided with n (n is a positive integer not less than 2) salient poles having the same width and equally spaced at regular angles, and a first fixed armature is provided with magnetic poles confronting the outer peripheral surface of the rotor. The magnetic poles are wound by three- or two-phase armature coils. A second fixed armature and its associated rotor with salient poles are provided to add an output torque eliminating ripple torque of the output torque generated by the first fixed armature.

5 Claims, 19 Drawing Sheets

5,619,113

RELUCTANCE-TYPE MOTOR

TECHNICAL FIELD

The present invention relates to a reluctance type motor having a large output and a small torque ripple and, therefore, preferably used as a driving source, for example, for electric cars, electric bioycles, cranes, electric cleaners, and the like.

BACKGROUND ART

Despite its large output torque, a reluctance type motor has so various disadvantages including low rotational speed and vibration that it has scarcely been practically utilized.

A first problem to be solved in the reluctance type motor is as follows: since the magnetic path of armature coils, formed in salient poles and magnet poles, is almost closed, the inductance of the reluctance type motor is very large. This increases magnetic energy amount stored into or discharged from magnetic poles or salient poles. And also this increases the repetition frequency of such energy storage and discharge during one complete revolution of the rotor. There is, therefore, a problem that the reluctance type motor cannot rotate in a high-speed region despite of outputting large output torque. Solving the above-described problem becomes difficult with increasing output of a reluctance type motor.

A second problem is as follows: FIG. 1 shows a plan view showing a well-known three-phase half-wave current supply mode reluctance type motor. A reference numeral 16 represents a fixed armature which is made of laminated layers of silicon steel sheets. Magnetic poles 16a, 16b, —are associated with armature coils 17a-1, 17b-1, —. A rotor 1 rotates in a direction of an arrow A. A reference numeral 5 represents a rotational shaft 5. When armature coils 17b-1, 17e-1 are activated, the rotor 1 rotates in the direction of the arrow A. After 120-degree rotation, these armature coils are deactivated. Next, armature coils 17c-1, 17f-1 are activated. After 120-degree rotation, these armature coils are deactivated.

As described above, the rotor 1 rotates in the order of the armature coils 17a-1, 17d-1→17b-1, 17e-1→17c-1, 17f-1 along the arrow A. Only two salient poles contribute to generation of the above-described rotational torque, and remaining four salient poles have no relation to this generation of rotational torque. If all the six salient poles generate torque simultaneously, a generated torque will be increased three times. However, this is not attainable.

Furthermore, a third problem is as follows: when the armature coils 17a-1, 17d-1 are activated, the magnetic poles 16a, 16d are magnetically attracted radially toward the salient poles 1a, 1e. Thus, the fixed armature 16 causes deformation due to this attraction force. When the rotor rotates, the fixed armature causes deformation due to another attraction forces generated by the magnetic poles 16b, 16e and 16c, 16f and their confronting salient poles. These deformation mechanism induces the vibration of the motor. As it is technically difficult to equalize the air gap length between salient poles and magnetic poles, an attraction force received by the rotor 1 changes its direction as the rotor 1 rotates. Thus, the rotor 1 causes vibration in the radial direction. Accordingly, vibration noise is generated. And, the durability of the bearing, provided for the rotational shaft of the rotor 1, is worsened. In the case of a large-output motor, it becomes difficult to solve the above-described problems.

Furthermore, a fourth problem is as follows. When the above-described second problem is solved, it will encounter with a large ripple torque as described later with reference to FIG. 11.

Accordingly, the present invention has an object to provide a reluctance-type motor capable of suppressing vibration, rotating at high speeds, generating a large output torque and bringing flat torque characteristics.

In order to accomplish above purpose, a first aspect of the present invention provides a reluctance type motor in a three-phase full-wave reluctance type motor, comprising: n first and second salient poles having the same width, equally spaced at regular angles and disposed at both ends of an outer peripheral surface of a magnetic rotor, where n is a positive integer not less than 2; No. 1-, No. 2- and No. 3-phase armature coils wound around 6n slots, being successively offset with a phase difference of 120 degrees in terms of electric angle, the 6n slots being disposed on an inner peripheral surface of a cylindrical first fixed armature and equally spaced at regular angles; a second fixed armature identical with the first fixed armature, having slots associated with No. 1-, No. 2- and No. 3-phase armature coils which are successively offset with a phase difference of 120 degrees in terms of electric angle; means for offsetting position of the slots of the first and second fixed armatures, so that No. 1-, No. 2- and No. 3-phase armature coils are disposed with an offset electric angle of odd multiple of 30 degrees with respect to corresponding No. 1-, No. 2- and No. 3-phase armature coils, or the first and second salient poles opposing each other are disposed with a mutual offset electric angle of odd multiple of 30 degrees therebetween while the No. 1-, No. 2- and No. 3-phase armature coils and the No. 1-, No. 2- and No. 3-phase armature coils are in phase; a position detecting device for detecting rotational position of the first salient pole and generating No. 1-phase position detecting signals having 120-degree width and mutually spaced at regular angles of 240 degrees in term of electric angle, No. 2-phase position detecting signals being delayed 120 degrees in terms of electric angle from the No. 1-phase position detecting signals, and No. 3-phase position detecting signals being delayed 120 degrees in terms of electric angle from the No. 2-phase position detecting signals, and further generating No. 1-, No. 2- and No. 3-phase position detecting signals delayed from the No. 1-, No. 2- and No. 3-phase position detecting signals by an electric angle of odd multiple of 30 degrees; semiconductor switching elements connected in series with each of the No. 1-, No. 2-, No. 3-phase, No. 1-, No. 2- and No. 3-phase armature coils; a DC electric power source supplying electric power to a serial joint unit consisting of the armature coil and the semiconductor switching element; a current supply control circuit for supplying current to the No. 1-, No. 2-, No. 3-, No. 1-, No. 2- and No. 3-phase armature coils by turning on corresponding semiconductor switching elements connected in series with the No. 1-, No. 2-, No. 3-, No. 1-, No. 2- and No. 3-phase armature coils in response to the No. 1-, No. 2-, No. 3-, No. 1-, No. 2- and No. 3-phase position detecting signals by an amount of signal width of each position detecting signal; a first electric circuit for transferring magnetic energy stored in the armature coil through a diode into a small-capacitance capacitor from a connecting point of the semiconductor switching element and the armature coil and holding it to quickly reduce exciting current of the armature coil when the semiconductor switching element is turned off at a terminal end of the position detecting signal; and a second electric circuit for discharging electrostatic energy stored in the small-capacitance capacitor into an armature coil to be activated next upon activation of the next activated armature coil, when the magnetic rotor rotates a predetermined angle and the next activated armature coil is activated in response to the position detecting signal by an amount of signal width of the position detecting signal.

A second aspect of the present invention provides a reluctance type motor in a three-phase half-wave reluctance type motor, comprising: n first salient poles having the same width, equally spaced at regular angles and disposed on an outer peripheral surface of a magnetic rotor, where n is a positive integer not less than 2; 6n second salient poles having the same width, equally spaced at regular angles and disposed on an outer peripheral surface of another magnetic rotor coaxial with and rotating synchronically with the magnetic rotor; No. 1-, No. 2- and No. 3-phase armature coils wound around 6n slots, being successively offset with a phase difference of 120 degrees in terms of electric angle, the 6n slots being disposed on an inner peripheral surface of a cylindrical fixed armature and equally spaced at regular angles; at least n magnetic poles having a predetermined width, equally spaced at regular angles and protruding from an inside surface of a cylindrical magnetic member disposed in parallel with the fixed armature, the magnetic poles being wound by exciting coils; means for arranging the first and second salient poles to confront over slight air gap the inside peripheral surface of the fixed armature and the magnetic poles of the cylindrical magnetic member, respectively; a position detecting device for detecting rotational position of the first salient pole and generating No. 1-phase position detecting signals having 120-degree width and mutually spaced at regular angles of 240 degrees in term of electric angle, No. 2-phase position detecting signals being delayed 120 degrees in terms of electric angle from the No. 1-phase position detecting signals, and No. 3-phase position detecting signals being delayed 120 degrees in terms of electric angle from the No. 2-phase position detecting signals; semiconductor switching elements connected in series with each of the No. 1-, No. 2- and No. 3-phase armature coils and the exciting coils; a DC electric power source supplying electric power to a serial joint unit consisting of the armature coil, the exciting coil and the semiconductor switching element; a current supply control circuit for supplying current to the No. 1-, No. 2- and No. 3-phase armature coils by turning on corresponding semiconductor switching elements connected in series with the No. 1-, No. 2- and No. 3-phase armature coils in response to the No. 1-, No. 2- and No. 3-phase position detecting signals by an amount of signal width of each position detecting signal; a first electric circuit for supplying current to the exciting coil in response to a position detecting signal obtained through detection of the position of the second salient pole, during a period from a point where the second salient pole begins entering an opposing magnetic pole to a point where both directly confront each other; a second electric circuit for transferring magnetic energy stored in the armature coil through a diode to a small-capacitance capacitor from a connecting point of the semiconductor switching element and the armature coil and holding it to quickly reduce exciting current of the armature coil when the semiconductor switching element is turned off at a terminal end of the position detecting signal; an electric circuit for discharging electrostatic energy stored in the small-capacitance capacitor into an armature coil to be activated next upon activation of the next activated armature coil, when the magnetic rotor rotates a predetermined angle and the next activated armature coil is activated in response to the position detecting signal by an amount of signal width of the position detecting signal; a current supply control circuit for maintaining current to be supplied to the exciting coil at a value corresponding to current to be supplied to the armature coil; and means for adjusting relative position of torque generating members so that a peak of ripple torque generated by the exciting coil is overlapped with a concave portion of ripple torque of an output torque generated by the armature coil when activated.

A third aspect of the present invention provides a reluctance type motor in a two-phase full-wave reluctance type motor, comprising: n first salient poles having the same width, equally spaced at regular angles and disposed at both ends of an outer peripheral surface of a magnetic rotor, where n is a positive integer not less than 2; 4n second salient poles equally spaced at regular angles and disposed on an outer peripheral surface of another magnetic rotor coaxial with and rotating synchronically with the magnetic rotor; No. 1-, No. 2-, No. 3- and No. 4-phase armature coils wound around 4n slots, being successively offset with a phase difference of 90 degrees in terms of electric angle, the 4n slots being disposed on an inner peripheral surface of a cylindrical fixed armature and equally spaced at regular angles; at least n magnetic poles having a predetermined width, equally spaced at regular angles and protruding from an inside surface of a cylindrical magnetic member disposed in parallel with the fixed armature, the magnetic poles being wound by exciting coils; means for arranging the first and second salient poles to confront over slight air gap with the inside peripheral surface of the fixed armature and the magnetic poles of the cylindrical magnetic member, respectively; a position detecting device for detecting rotational position of the first salient pole and generating No. 1-, No. 2-, No. 3- and No. 4-phase position detecting signals having 90-degree width in terms of electric angle and continuous one another; semiconductor switching elements connected in series with each of the No. 1-, No. 2-, No. 3- and No. 4-phase armature coils and the exciting coils; a DC electric power source supplying electric power to a serial joint unit consisting of the armature coil, the exciting coil and the semiconductor switching element; a current supply control circuit for supplying current to the No. 1-, No. 2-, No. 3- and No. 4-phase armature coils by turning on corresponding semiconductor switching elements connected in series with the No. 1-, No. 2-, No. 3- and No. 4-phase armature coils in response to the No. 1-, No. 2-, No. 3- and No. 4-phase position detecting signals by an amount of signal width of each position detecting signal; a first electric circuit for supplying current to the exciting coil in response to a position detecting signal obtained through detection of the position of the second salient pole, during a period from a point where the second salient pole begins entering an opposing magnetic pole to a point where both directly confront each other; a second electric circuit for transferring magnetic energy stored in the armature coil through a diode to a small-capacitance capacitor from a connecting point of the semiconductor switching element and the armature coil and holding it to quickly reduce exciting current of the armature coil when the semiconductor switching element is turned off at a terminal end of the position detecting signal; an electric circuit for discharging electrostatic energy stored in the small-capacitance capacitor into an armature coil to be activated next upon activation of the next activated armature coil, when the magnetic rotor rotates a predetermined angle and the next activated armature coil is activated in response to the position detecting signal by an amount of signal width of the position detecting signal; a current supply control circuit for maintaining current to be supplied to the exciting coil at a value corresponding to current to be supplied to the armature coil; and means for adjusting relative position of torque generating members so that a peak of ripple torque generated by the exciting coil is overlapped with a concave portion of ripple torque of an output torque generated by the armature coil when activated.

A fourth aspect of the present invention provides a reluctance type motor in a three-phase full-wave reluctance type motor, comprising: n first and second salient poles having the same width, equally spaced at regular angles and disposed at both ends of an outer peripheral surface of a magnetic rotor, where n is a positive integer not less than 2; 3n slots equally spaced at regular angles and disposed on an inner peripheral surface of a cylindrical first fixed armature; No. 1-, No. 2- and No. 3-phase armature coils, each wound around adjacent two slots; a second fixed armature identical with the first fixed armature, having slots associated with No. 1-, No. 2- and No. 3-phase armature coils which are successively offset with a phase difference of 120 degrees in terms of electric angle; means for offsetting position of the slots of the first and second fixed armatures, so that No. 1-, No. 2- and No. 3-phase armature coils are disposed with an offset electric angle of odd multiple of 60 degrees with respect to corresponding No. 1-, No. 2- and No. 3-phase armature coils, or the first and second salient poles opposing with each other are disposed with an offset electric angle of odd multiple of 60 degrees therebetween while the No. 1-, No. 2- and No. 3-phase armature coils and the No. 1-, No. 2- and No. 3-phase armature coils are in phase; a position detecting device for detecting rotational position of the first salient pole and generating No. 1-phase position detecting signals having 120-degree width and mutually spaced at regular angles of 240 degrees in term of electric angle, No. 2-phase position detecting signals being delayed 120 degrees in terms of electric angle from the No. 1-phase position detecting signals, and No. 3-phase position detecting signals being delayed 120 degrees in terms of electric angle from the No. 2-phase position detecting signals, and further generating No. 1-, No. 2- and No. 3-phase position detecting signals delayed from the No. 1-, No. 2- and No. 3-phase position detecting signals by an electric angle of odd multiple of 60 degrees; semiconductor switching elements connected in series with each of the No. 1-, No. 2-, No. 3-phase, No. 1-, No. 2- and No. 3-phase armature coils; a DC electric power source supplying electric power to a serial joint unit consisting of the armature coil and the semiconductor switching element; a current supply control circuit for supplying current to the No. 1-, No. 2-, No. 3-, No. 1-, No. 2- and No. 3-phase armature coils by turning on corresponding semiconductor switching elements connected in series with the No. 1-, No. 2-, No. 3-, No. 1-, No. 2- and No. 3-phase armature coils in response to the No. 1-, No. 2-, No. 3-, No. 1-, No. 2- and No. 3-phase position detecting signals by an amount of signal width of each position detecting signal; a first electric circuit for transferring magnetic energy stored in the armature coil through a diode into a small-capacitance capacitor from a connecting point of the semiconductor switching element and the armature coil and holding it to quickly reduce exciting current of the armature coil when the semiconductor switching element is turned off at a terminal end of the position detecting signal; and a second electric circuit for discharging electrostatic energy stored in the small-capacitance capacitor to an armature coil to be activated next upon activation of the next activated armature coil, when the magnetic rotor rotates a predetermined angle and the next activated armature coil is activated in response to the position detecting signal by an amount of signal width of the position detecting signal.

And a fifth aspect of the present invention provides a three-phase reluctance type motor in a three-phase half-wave reluctance type motor, comprising: n first salient poles having the same width, equally spaced at regular angles and disposed on an outer peripheral surface of a magnetic rotor, where n is a positive integer not less than 2; 3n second salient poles having the same width, equally spaced at regular angles and disposed on an outer peripheral surface of another magnetic rotor coaxial with and rotating in synchronism with the magnetic rotor; 3n slots being disposed on an inner peripheral surface of a cylindrical fixed armature and equally spaced at regular angles; 3n No. 1-, No. 2- and No. 3-phase armature coils wound around adjacent two slots; at least n magnetic poles having a predetermined width, equally spaced at regular angles and protruding from an inside surface of a cylindrical magnetic member disposed in parallel with the fixed armature, the magnetic poles being wound by exciting coils; means for arranging the first and second salient poles to confront over slight air gap the inside peripheral surface of the fixed armature and the magnetic poles of the cylindrical magnetic member, respectively; a position detecting device for detecting rotational position of the first salient pole and generating No. 1-phase position detecting signals having 120-degree width and mutually spaced at regular angles of 240 degrees in term of electric angle, No. 2-phase position detecting signals being delayed 120 degrees in terms of electric angle from the No. 1-phase position detecting signals, and No. 3-phase position detecting signals being delayed 120 degrees in terms of electric angle from the No. 2-phase position detecting signals; semiconductor switching elements connected in series with each of the No. 1-, No. 2- and No. 3-phase armature coils and the exciting coils; a DC electric power source supplying electric power to a serial joint unit consisting of the armature coil, the exciting coil and the semiconductor switching element; a current supply control circuit for supplying current to the No. 1-, No. 2- and No. 3-phase armature coils by turning on corresponding semiconductor switching elements connected in series with the No. 1-, No. 2- and No. 3-phase armature coils in response to the No. 1-, No. 2- and No. 3-phase position detecting signals by an amount of signal width of each position detecting signal; a first electric circuit for supplying current to the exciting coil in response to a position detecting signal obtained through detection of the position of the second salient pole, during a period from a point where the second salient pole begins entering an opposing magnetic pole to a point where both directly confront each other; a second electric circuit for transferring magnetic energy stored in the armature coil through a diode into a small-capacitance capacitor from a connecting point of the semiconductor switching element and the armature coil and holding it to quickly reduce exciting current of the armature coil when the semiconductor switching element is turned off at a terminal end of the position detecting signal; an electric circuit for discharging electrostatic energy stored in the small-capacitance capacitor to an armature coil to be activated next upon activation of the next activated armature coil, when the magnetic rotor rotates a predetermined angle and the next activated armature coil is activated in response to the position detecting signal by an amount of signal width of the position detecting signal; a current supply control circuit for maintaining current to be supplied to the exciting coil at a value corresponding to current to be supplied to the armature coil; and means for adjusting mutual position of torque generating members so that a peak of ripple torque generated by the exciting coil is overlapped with a bottom portion of ripple torque of an output torque generated by the armature coil when activated.

In accordance with the present invention, the reluctance type motor has a large inductance since the magnetic core of the armature and the salient poles of the rotor interact to close their magnetic path when the armature coil is activated. Hence, current of the armature coil builds up slowly in the beginning, while decrease of the current is delayed when the armature coil is deactivated. Accordingly, there is a disadvantage that the motor cannot run fast. This disadvantage is enhanced when the output of the motor is large.

According to the present invention, when the armature coil is deactivated, magnetic energy stored in the armature coil is discharged into a small-capacitance capacitor to charge it up and make current reduce steeply. Furthermore, high voltage of this capacitor is utilized to sharply build up current supplied to a next activated armature coil. Therefore, even if a motor has a large output, it can rotate at a high speed.

Next, as all the salient poles of the rotor always contribute to generate output torque, the output obtained becomes large.

Furthermore, as all the salient poles of the rotor are magnetically attracted radially outward, generation of vibration is suppressed.

If the motor is constituted so as to accomplish the above-described second function, the following disadvantage will arise: as later described with reference to FIG. 11, a large ripple torque is generated corresponding to the width of the magnetic poles. The present invention provides a device which generates another ripple torque having a peak overlapped with the bottom of the ripple torque to flatten the overall output torque, thereby eliminating the above-described disadvantage.

As explained above, the present invention brings a large output torque approximately 10 times as much as that of the same type induction motor. The rotational speed can be increased up to 20 thousands rpm as occasion demands. Compared with a conventional reluctance type motor shown in FIG. 1, vibration is reduced and rotation of the motor is smoothed.

Furthermore, the output torque characteristics is flattened.

BEST MODE FOR CARRYING OUT THE INVENTION

Figure 1:
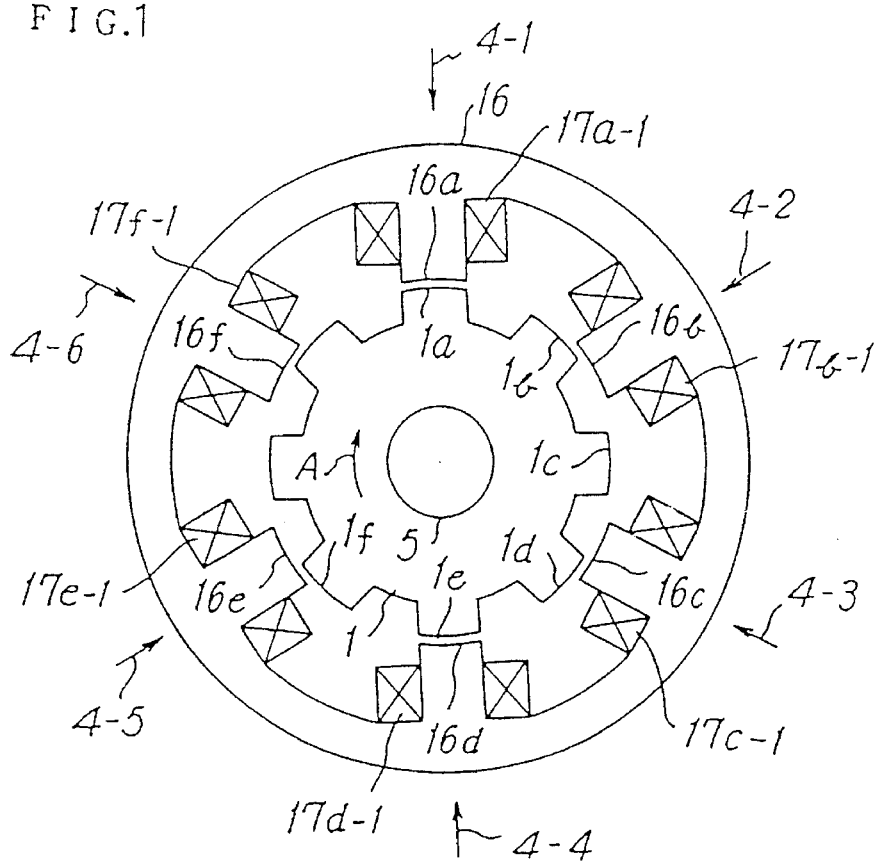
FIG. 1 is a cross-sectional view showing a fixed armature and a rotor of a conventional reluctance type motor.

With reference to embodiments, the present invention apparatuses will be explained in details. The same reference numerals in respective drawings denote the like components and thus will not be explained duplicately.

Figure 2:
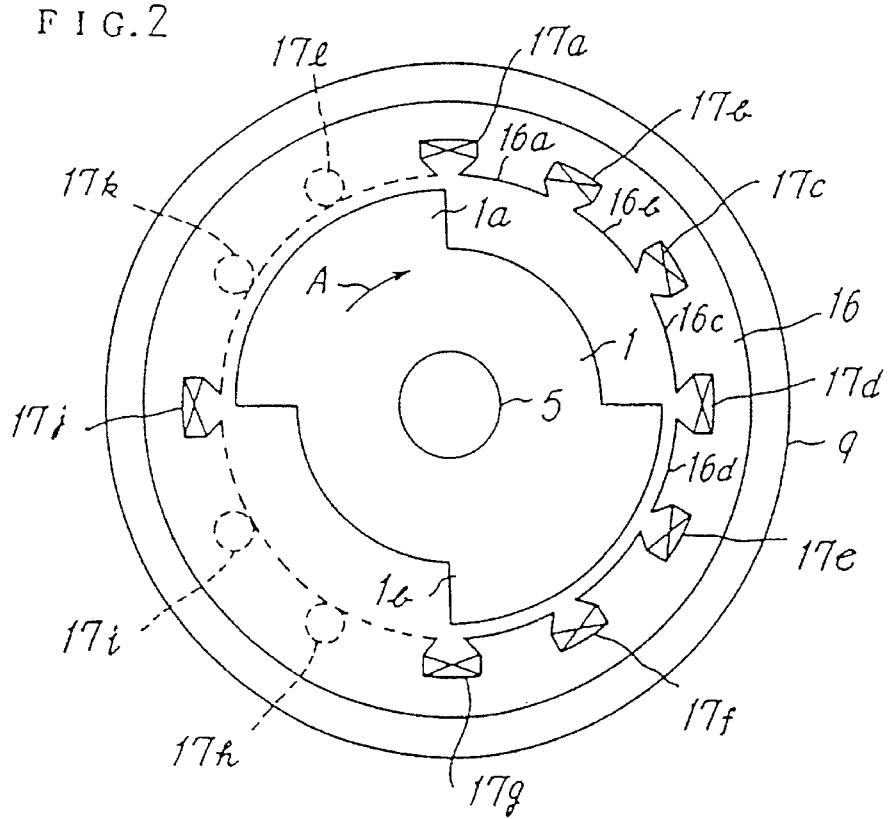
FIG. 2 is a cross-sectional view showing a fixed armature and a rotor of a three-phase reluctance type motor in accordance with the present invention.

In FIG. 2, a cylindrical fixed armature 16 is secured to the inside of an outer casing 9. The fixed armature 16 is made of well-known laminated layers of silicon steel sheets, and has an inner peripheral surface provided with 12 slots being mutually spaced at regular angles. Each slot is wound by an armature coil. The slots 17a, 17d, which are two slots spaced 180 degrees in terms of electric angle, are respectively wound by an armature coil. In the following explanation, all the angles will be expressed in terms of electric angle. The slots 17b, 17e and the slots 17c, 17f are respectively wound by an armature coil. Other armature coils are constituted similarly. A rotational shaft 5 is rotatably supported by bearings provided on the both sides of the outer casing 9. A magnetic rotor 1 is fixed to the rotational shaft 5. The magnetic rotor 1 is made of the same laminated layers of silicon steel sheets as the fixed armature 16.

The rotor 1 is provided with salient poles 1a and 1b protruding from the outer peripheral surface of the rotor 1. The outer peripheral surface of the rotor 1 confronts with the magnetic poles 16a, 16b, —through the air gap of approximately 0.5 mm.

Figure 3:
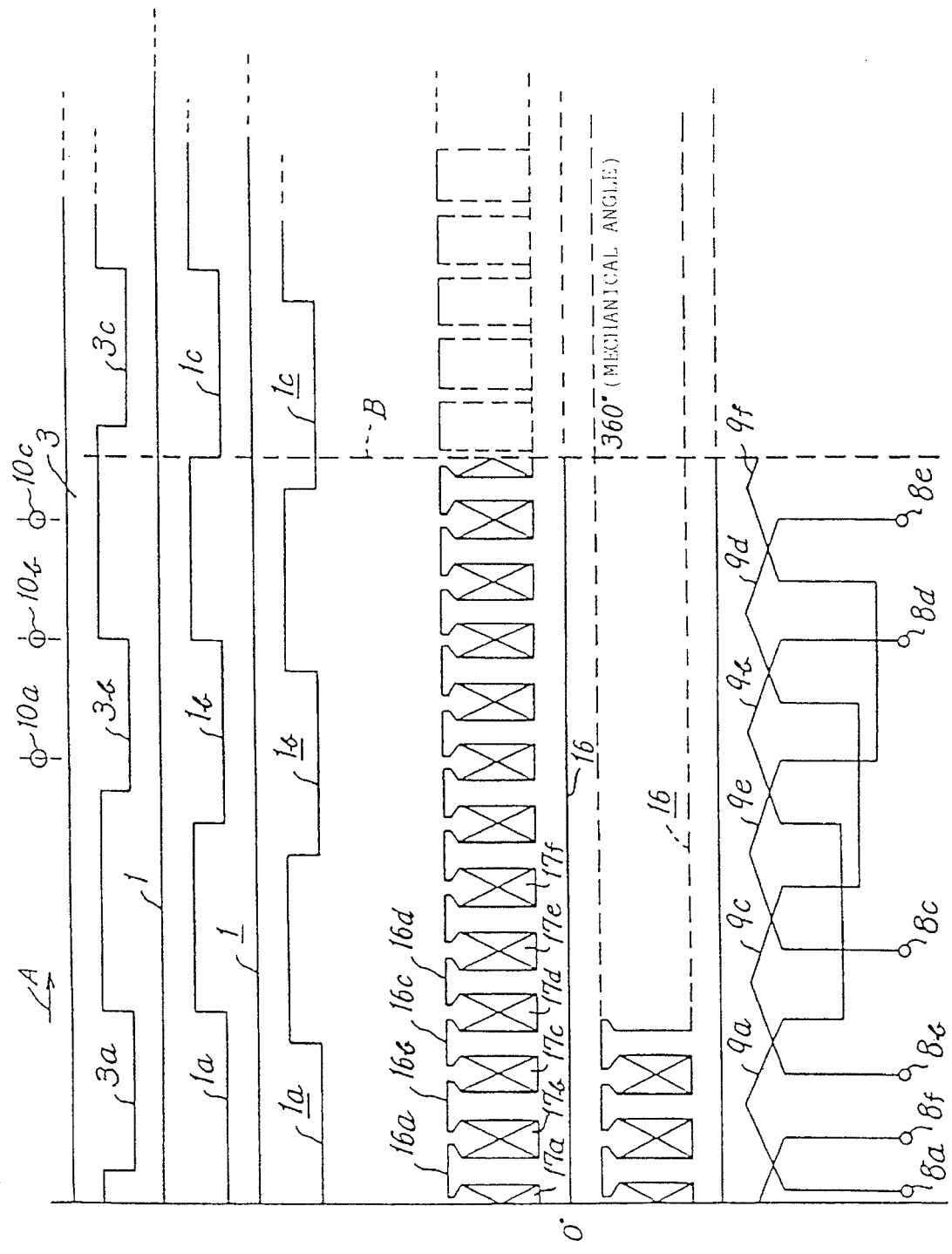
FIG. 3 is a development showing the rotor, fixed armature and armature coils of the three-phase reluctance type motor in accordance with the present invention.

FIG. 3 is a development of FIG. 2. The left side of the dotted line B corresponds to the development of FIG. 2. The rotor is represented by a reference numeral 1 while the fixed armature is represented by a reference numeral 16.

In FIG. 3, an armature coil wound around the slots 17a and 17d is shown as an armature coil 9a in the bottom of the drawing. An armature coil wound around the slots 17c and 17f is shown as an armature coil 9c. In the same manner, other armature coils are denoted by reference numerals 9b, 9d, 9e and 9f. The armature coils 9a and 9b are connected in series and are supplied with electric power from the terminals 8a and 8d. The armature coils 9c, 9d and the armature coils 9e, 9f are connected in series and are supplied with electric power from the terminals 8b, 8e and 8c, 8f, respectively. Armature coils are spaced 120 degrees from one another. The armature coils 9a, 9b, the armature coils 9c, 9d and the armature coils 9e, 9f constitute No. 1-, No. 2- and No. 3-phase armature coils, respectively.

If the No. 1-phase armature coils 9a, 9b are activated when the rotor 1 shifts 180 degrees left and stops there, the salient poles 1a, 1b are magnetically attracted by the magnetic poles 16a, 16b, 16c and their opposing magnetic poles so that the rotor 1 rotates in a direction A. When the rotor 1 rotates 120 degrees, the armature coils 9a, 9b are deactivated and the armature coils 9c, 9d (No. 2-phase armature coil) are activated to rotate the rotor 1 right. When the rotor 1 further rotates 120 degrees, the armature coils 9c, 9d are deactivated and the No. 3-phase armature coils 9e, 9f are activated to further rotate the rotor 1 right. As can be understood from the foregoing description, when the No. 1-, No. 2- and No. 3-phase armature coils are successively activated by current supply of 120-degree width, the rotor 1 rotates in the direction of the arrow A, thus acting as a three-phase half-wave current mode reluctance type motor.

It is possible to add another salient-pole 1c to provide a total of three salient poles. In such a case, the dotted line B would shift 360 degrees right. The number of salient poles can be any one not less than 2. The output torque will be enlarged with increasing number of salient poles. Although motor of FIG. 1 has six salient poles 1a, 1b, —, only two of these six contribute to generating an output torque. Meanwhile, according to the arrangement of the present invention, the output torque is obtained from six salient poles; therefore, the output torque can be increased three times.

The conventional motor shown in FIG. 1 causes deformation because the fixed armature 16 receives magnetic attraction forces acting in the directions of arrows 4-1, 4-4 as a result of interaction with the salient poles 1a, 1e. After rotation of 120 degrees, deformation is then caused by the salient poles 1b, 1f in the directions of arrows 4-2, 4-5. After further rotation of 120 degrees, deformation is caused in the directions of arrows 4-3, 4-6. Hence, the direction of deformation rotates in synchronism with its rotation and vibration is generated. On the other hand, in the present invention, attraction forces arise from all the salient poles simultaneously. The fixed armature 16 therefore receives only a compression force acting along a circumferential direction and hence causes no deformation. Thus, vibration will be effectively suppressed.

Regarding the polarity of the magnetic poles to be magnetized by armature coils, magnetization is such that magnetic poles disposed symmetrically about axis in FIG. 2 have opposite polarities with each other.

Next, a current supply means for activating armature coils driven by the fixed armature 16 confronting with the rotor 1 shown in FIG. 3 will be explained.

In FIG. 3, the armature coils 9a, 9b are referred to as an armature coil 39a, and the armature coils 9c, 9d and the armature coils 9e, 9f are referred to as armature coils 39b and 39c, respectively. The rotor 3 of FIG. 3 is constituted to be coaxial with the rotor 1 and synchronously rotates with the rotor 1. The rotor 3 can be made of conductive material such as aluminum. The salient poles 3a, 3b, 3c—have a width of 150 degrees, and rotate with the mutual phase shown in the drawing.

Figure 6:
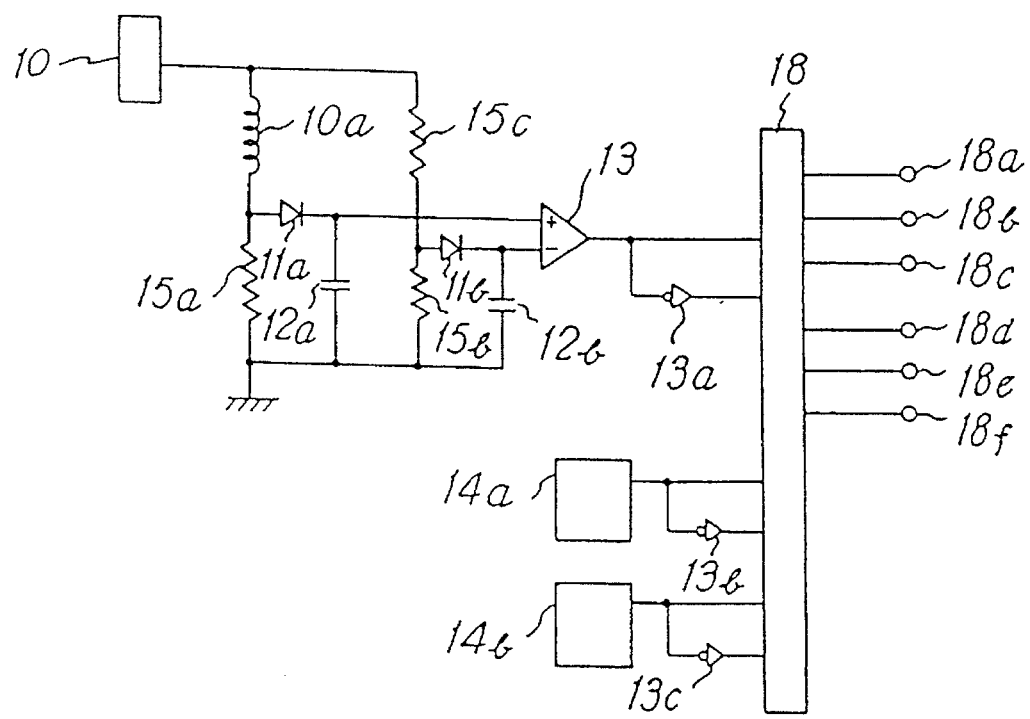
FIG. 6 is a diagram showing an electric circuit for obtaining position detecting signals of the three-phase reluctance type motor.

Coils 10a, 10b, and 10c are position detecting elements for detecting positions of the salient poles 3a, 3b, —and are fixed on the armature 16 as shown in the drawings. Their coil surfaces face to side surfaces of the salient poles 3a, 3b, —over air gap. The coils 10a, 10b, and 10c are spaced 120 degrees from one another. The coil is of a 30-turn air-core having a diameter of 5 mm. FIG. 6 shows a device for obtaining position detecting signals from these coils 10a, 10b, and 10c. In FIG. 6, the coil 10a and resistors 15a, 15b, and 15c constitute a bridge circuit. This bridge circuit is adjusted to be balanced when the coil 10a does not directly confront with the salient poles 3a, 3b, —. Accordingly, an output of a low-pass filter consisting of a diode 11a and a capacitor 12a and an output of a low-pass filter consisting of a diode 11b and a capacitor 12b are equal with each other and, therefore, an output of the operational amplifier 13 becomes a LOW-level. A reference numeral 10 represents an oscillator which produces approximately 2 MHz oscillation. When the coil 10a directly confront the salient poles 3a, 3b, —, an impedance is reduced due to iron loss. Therefore, a voltage drop in the resistor 15a becomes large and therefore the output of the operational amplifier 13 becomes a HIGH-level.

Figure 13:
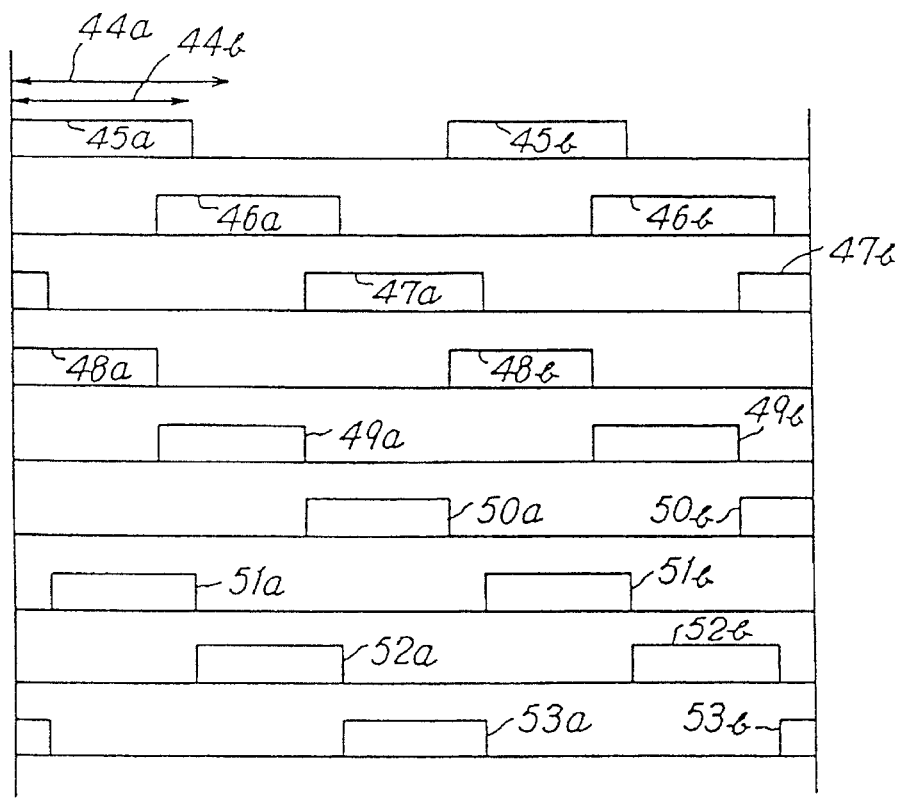
FIG. 13 is a time chart showing position detecting signal curves of the three-phase reluctance type motor.

Inputs to the block circuit 18 are shown by curves 45a, 45b, —in a time chart of FIG. 13, and inputs supplied through an inversion circuit 13a are identical with inverted curves of these curves 45a, 45b, —. Block circuits 14a, 14b in FIG. 6 include the coils 10b and 10c, respectively, and have the same constitution as the above-described block circuit. The oscillator 10 can be utilized commonly among these block circuits. An output of the block circuit 14a and an output of the inversion circuit 13b are inputted into the block circuit 18, and their output signals become curves 46a, 46b, —and the inverted curves of these curves 46a, 46b, —, as shown in FIG. 13. An output of the block circuit 14b and an output of the inversion circuit 13c are inputted into the block circuit 18, and their output signals become curves 47a, 47b, —and the inverted curves of these curves 47a, 47b, as shown in FIG. 13. The curves 46a, 46b, —are delayed 120 degrees in their phase with respect to the curves 45a, 45b, —. In the same way, the curves 47a, 47b, —are delayed 120 degrees in their phase with respect to the curves 46a, 46b, —. The block circuit 18 is a circuit conventionally utilized in a control circuit of a three-phase Y-type semiconductor motor. That is, the block circuit 18 is a logic circuit that generates 120-degree width rectangular-waveform electric signals from terminals 18a, 18b, —, 18f in response to the above-described position detecting signals. Outputs from the terminals 18a, 18b, and 18c are shown by curves 48a, 48b, —, curves 49a, 49b, —, and curves 50a, 50b, —in FIG. 13, respectively. Outputs from the terminals 18d, 18e, and 18f are shown by curves 51a, 51b, —, curves 52a, 52b, —, and curves 53a, 53b, —in FIG. 13, respectively. Phase difference of the output signals between the terminals 18a and 18d, between the terminals 18b and 18e, and between the terminals 18c and 18f is 30 degrees. Output signals of the terminals 18a, 18b and 18c are successively delayed 120 degrees from one another, and output signals of the terminals 18d, 18e and 18f are successively delayed 120 degrees from one another, similarly.

An arrow 44a denotes a 180-degree width, while an arrow 44b denotes a 150-degree width. A means for obtaining the curves 48a, 48b, —is an AND circuit which inputs both the inverted output of the curves 46a, 46b, —and the curves 45a, 45b, —, thereby obtaining the output of the curves 48a, 48b, —. Other curves shown in the bottom of FIG. 13 are also obtained by the similar means. These means are shown as the block circuit 18.

Next, the current supply control means of the armature coils will be explained with reference to FIG. 8. Both ends of the armature coils 39a, 39b, and 39c are connected with transistors 20a, 20b, and 20c, 20d, and 20e, 20f. The transistors 20a, 20b, 20c, —serve as switching elements and can be substituted by other semiconductor elements having the same effect. A DC electric power source supplies electric power from its positive and negative terminals 2a, 2b. When a downside input of the AND circuit 41a is a HIGH-level, the transistors 20a, 20b are turned on in response to a HIGH-level signal from the terminal 42a. Thus, the armature coil 39a is activated. In the same way, when HIGH-level signals are inputted from the terminals 42b, 42c, the transistors 20c, 20d and the transistors 20e, 20f are turned on to activate the armature coils 39b, 39c, respectively. A terminal 40 is supplied with a reference voltage specifying an exciting current. By changing a voltage of the terminal 40, an output torque can be changed. When an electric power switch (not shown) is turned on, an output of an operational amplifier 40b becomes a HIGH level since an input of a negative terminal of the operational amplifier 40b is lower than that of its positive terminal. Accordingly, the transistors 20a, 20b turn on to apply a voltage to the current supply control circuit of the armature coil 39a. A resistor 22a is provided for detecting exciting current flowing through the armature coil 39a. A reference numeral 30a represents an absolute-value circuit.

Position detecting signals 48a, 48b, —of FIG. 13 show the input signal from the terminal 42a. Position detecting signals 49a, 49b, —and 50a, 50b, —show the input signals from the terminals 42b and 42c. One of the above-described position detecting signal curves is shown as a curve 48a in the upper part of a time chart of FIG. 7. The armature coil 39a is supplied with an exciting current during a time period corresponding to this curve 48a. An arrow 23a shows a current supply angle of 120 degrees. In an initial stage of the current supply period, building-up of the exciting current is delayed due to inductance of the armature coil itself. If the current is stopped, magnetic energy stored in the armature coil is discharged to the electric power source through diodes 21a, 21b if the diode 49a-1 of FIG. 8 is omitted. Therefore, the current decreases as shown by a second half portion of the curve 25; i.e. a right side of the dotted line K-1. A section where positive torque is generated is a 180-degree section shown by an arrow 23; therefore, counter torque by which both output torque and efficiency are decreased is generated. This phenomenon becomes remarkable as the speed increases. It is therefore feared that the motor cannot be practically used in a high-speed region.

This is because a time width of the positive torque generating section 23 becomes small in proportion to an increase of the rotational speed, while a time width of the counter torque generating section does not vary even if the motor speed becomes a high speed. The same explanation is applied to the current supply operation of the armature coils 39b, 39c based on other position detecting signals 49a, 50a. Since a building-up portion of the curve 25 is also delayed, an output torque is decreased. That is, torque reduction occurs. This is because the magnetic poles and the salient poles interact to close the magnetic path so as to have a large inductance. Although the reluctance type motor has a disadvantage in that it cannot increase its rotational speed notwithstanding an advantage of large output torque, such a disadvantage derives from the above-described counter torque and torque reduction. In order to resolve such disadvantages, a conventional means advances the current supply timing before the salient poles confront with the magnetic poles.

Advancing the current supply timing makes an exciting current build up quickly because of small inductance of the magnetic poles. However, inductance abruptly increases when an output torque begins arising, i.e. when the salient poles begin confronting with the magnetic poles. Hence, the exciting current declines steeply. Accordingly, an output torque reduces. In the case where a motor is driven in both forward and reverse directions, position detecting elements will be required twice in number.

Figure 8:
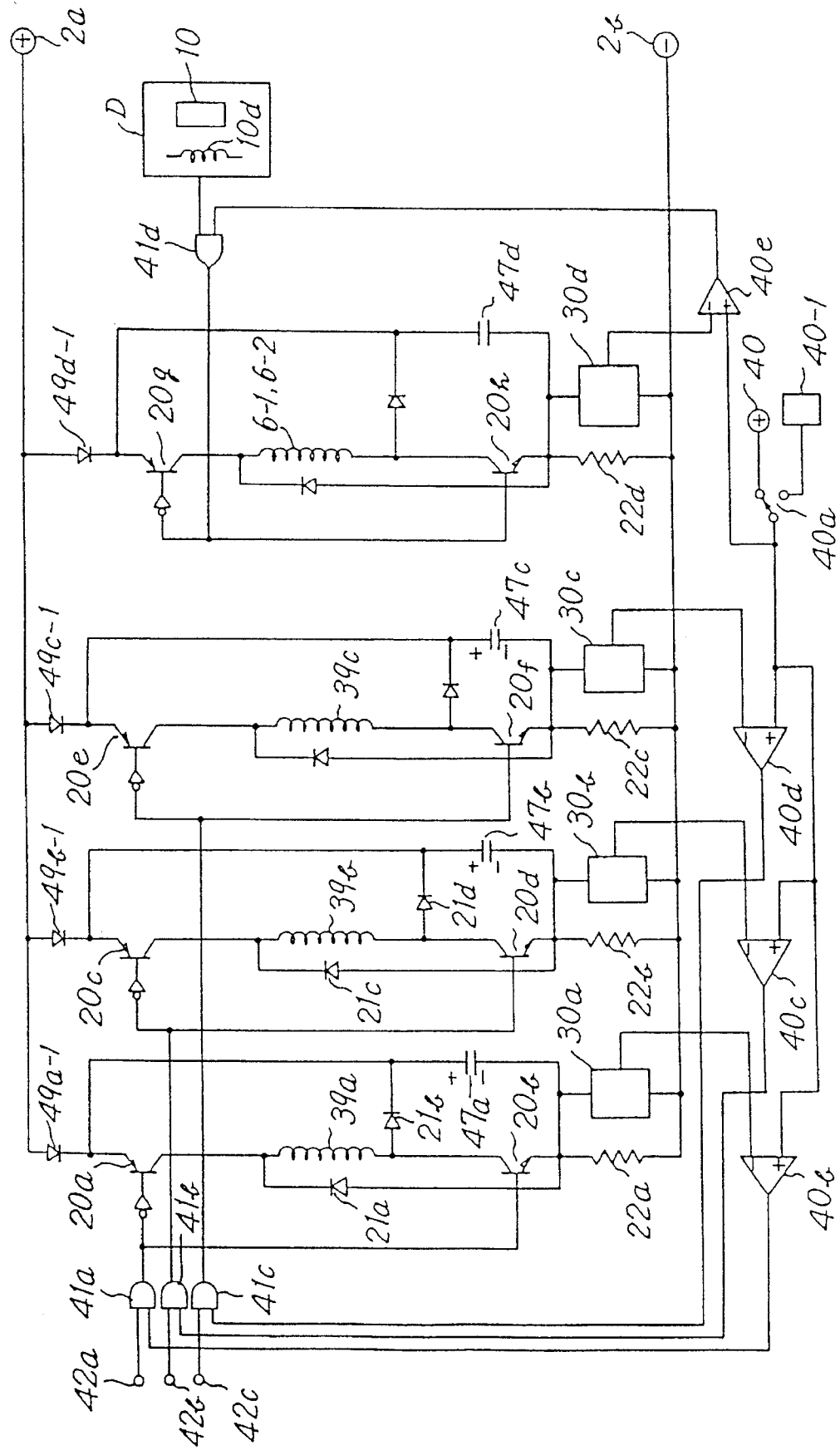
FIG. 8 is a circuit diagram showing a current supply control circuit for the three-phase reluctance type motor.

An apparatus in accordance with the present invention is characterized in that above-mentioned disadvantage is eliminated by additionally providing back-flow preventing diodes 49a-1, 49b-1, 49c-1, and capacitors 47a, 47b, 47c shown in FIG. 8.

When the current is terminated at the terminal end of the curve 25a, magnetic energy stored in the armature coil 39a is discharged through the diodes 21b, 21a to the capacitor 47a so as to charge it up to a high voltage with polarities shown in the drawing, being prevented from returning to the DC electric power source side by the function of the back-flow preventing diode 49a-1. Accordingly, the magnetic energy is sharply extinguished and the current decreases steeply.

Figure 7:
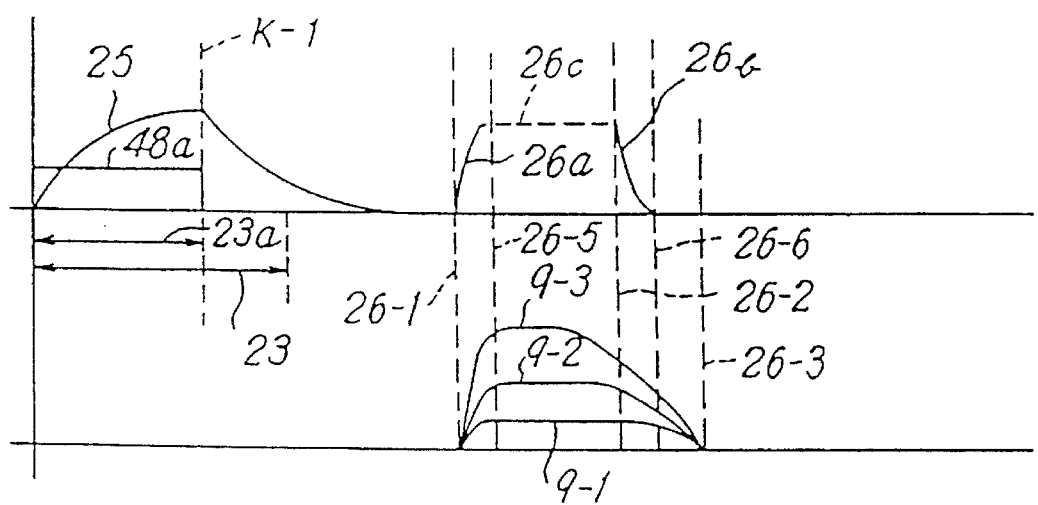
FIG. 7 is a graph showing a position detecting signal and the corresponding torque.

Curves 26a, 26b, and 26c shown in the upper part of the time chart of FIG. 7 cooperatively represent a curve of current flowing the armature coil 39a. Both dotted lines 26-1, 26-2 are spaced 120 degrees. The armature current decreases steeply like the curve 26b and therefore no counter torque is generated. The capacitor 47a is charged up to a high voltage and held at this voltage. Next, in response to the position detecting signal of curve 48b, the transistors 20a, 20b are turned on to activate the armature coil 39a again. A voltage equivalent to a summation of the charged voltage of the capacitor 47a and the DC electric power source voltage (a voltage between the terminals 2a, 2b) is applied to the armature coil 39a in this case; therefore, an exciting current of the armature coil 39a builds up sharply.

By virtue of this phenomenon, the exciting current builds up abruptly as shown by the curve 26a. As is explained above, the torque reduction and the counter torque are removed. And, as the armature current becomes substantially the rectangular waveform, an output torque is increased.

Next, a chopper circuit will be explained. When the exciting current of the armature coil 39a increases and therefore the voltage drop in the resistor 22a for detecting the armature current value increases to exceed the reference voltage of the reference voltage terminal 40 (i.e. an input voltage of the positive terminal of the operational amplifier 40b), a downside input of the AND circuit 41a becomes a LOW level. Thus, the transistors 20a, 20b are turned off and the exciting current is decreased. Due to hysteresis characteristics of the operational amplifier 40b, the output of the operational amplifier 40b returns to a HIGH level after a predetermined amount decrease. The transistors 20a and 20b, then, turn on to increase the exciting current. By repeating such a cycle, the exciting current is maintained at a predetermined value. A section indicated by the curve 26c of FIG. 7 is a section where chopper control is carried out. The height of the curve 26c is regulated by the voltage of the reference voltage terminal 40. The armature coil 39b of FIG. 8 is activated by the transistors 20c, 20d which are turned on in response to position detecting signal curves 49a, 49b, —supplied from the terminal 42b. A chopper control is carried out by the operational amplifier 40c, resistor 22b, absolute-value circuit 30b, and AND circuit 41b. Functions and effects of the diode 49b-1 and the capacitor 47b are the same as those for the armature coil 39a. The same explanation will be applied to the armature coil 39c. The armature coil 39c is activated in response to the position detecting signal curves 50a, 50b, —of FIG. 13 supplied from the terminal 42c. Functions and effects of the transistors 20e, 20f, AND circuit 41c, operational amplifier 40d, resistor 22c, absolute-value circuit 30c, diode 49c-1 and capacitor 47c are the same as in previously explained case.

Current supply to each armature coil can be initiated either when the salient poles come to confront with the magnetic poles or when approximately 30 degrees has passed thereafter. An adjustment is carried out by taking account of rotational speed, efficiency, and output torque to change the fixing positions of the detecting coils 10a, 10b and 10c being fixed on the armature side for serving as position detecting elements. As is apparent from the foregoing description, it becomes possible to drive a motor at a high speed with good efficiency and large output as a three-phase half-wave current supply mode motor. Thus, one of purposes of the present invention can be accomplished. However, as the output torque contains a large ripple, a problem may arise depending on the purpose of usage. The present invention is characterized by a three-phase full-wave current supply mode motor capable of solving the above-described problem.

Figure 11:
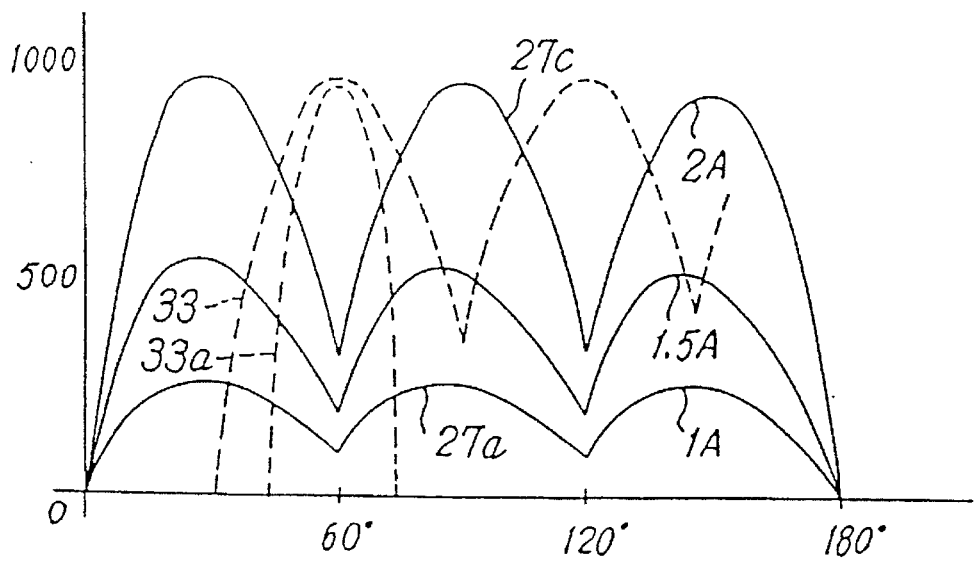
FIG. 11 is a graph showing output torque curves of the three-phase reluctance type motor.

FIG. 11 shows torque curves in the three-phase half-wave current supply mode, wherein the abscissa represents the rotational angle of the rotor and the ordinate represents the output torque. Curves 27a, 27b and 27c represents output torques corresponding to 1, 1.5 and 2 amperes, respectively. A diameter of the rotor is 22 mm. An outer diameter of the fixed armature is 50 mm, and its length is also 50 mm. The abscissa is represented by the rotational angle. The ripple torque is approximately 70%. A bottom portion of the torque curve corresponds to the point where the tip of the salient pole enters into the slot. At the eft edge of the curve 27c, i.e. at 0 degree, the output is zero. Accordingly, if the salient pole is positioned at the above-explained point when the electric power is turned on, starting a motor will be difficult. If the armature coil is activated immediately after the salient pole has passed through the slot, a torque is obtained in a required direction, thus eliminating the above-described problem.

As described later with reference to FIG. 12, the above-described disadvantage is recognized in spite of a large output torque. Accordingly, the above-described disadvantage is removed by adding a device which enables to obtain an output torque indicated by the dot curve 33 or 33a using a three-phase full-wave current supply or other means. This is one of the purposes of the present invention.

Figure 12:
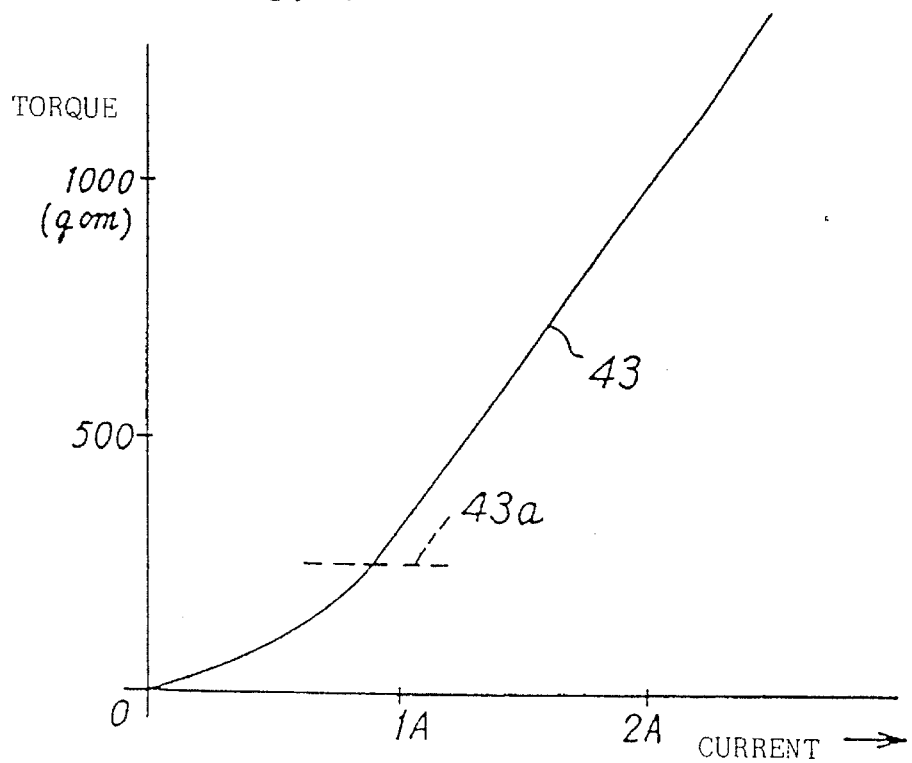
FIG. 12 is a graph showing a relation between the exciting current and the output torque in the reluctance type motor.

FIG. 12 is a graph showing output torque curves, wherein the abscissa represents the armature current and the ordinate represents the torque. This motor has the construction as described above.

The initial part of the curve 43 is a curve of the second order and the remaining part of the curve 43 is a straight line. In a general motor, magnetic flux is saturated at the level of the dotted line 43a and an output torque not larger than the level of the dotted line 43a is obtained. According to the apparatus of the present invention, the torque going beyond that level increases linearly. Thus the output torque increases up to seven times as large as other same-type motors.

Addition of the torque indicated by the dotted line 33 of FIG. 11 can be realized by adding a three-phase half-wave current supply mode motor whose salient poles or slots are offset from one another by an angle of odd multiple of 30 degrees, in such a manner that the rotational shaft is commonly used. The means for realizing this will be explained next.

Figure 5:
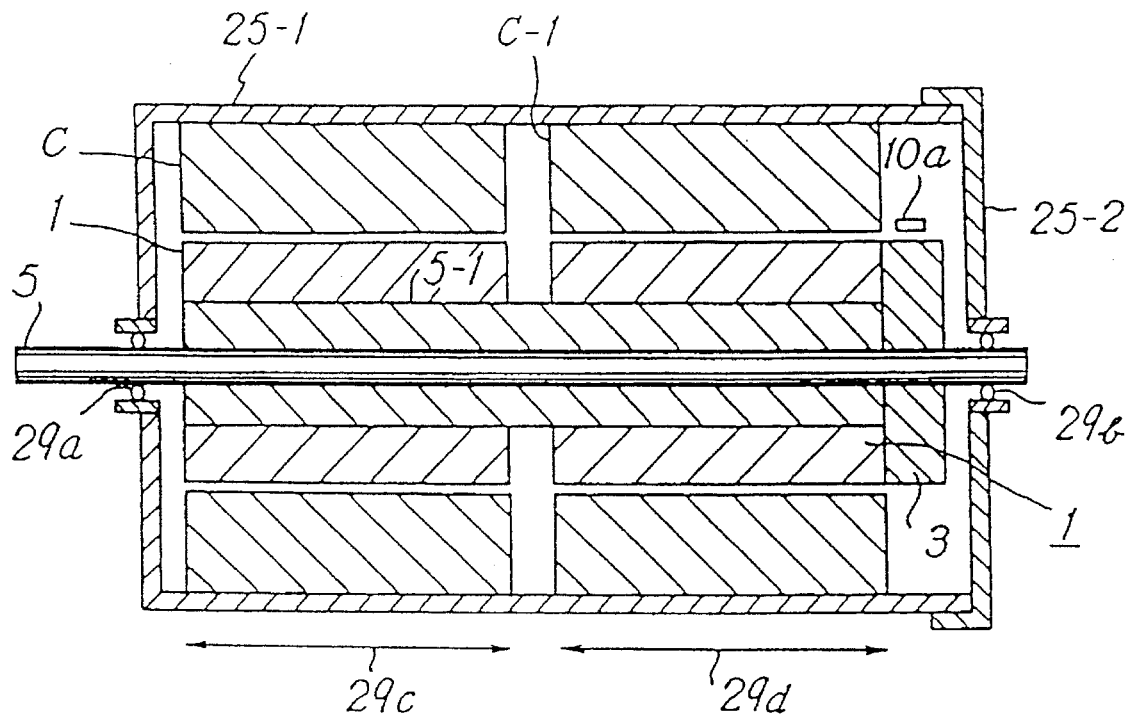
FIG. 5 is a transversal cross-sectional view of the present invention apparatus.

FIG. 5 is a cross-sectional view showing an overall constitution. In FIG. 5, a metallic outer casing (cylinder) 25-1 is coupled with an outer flange of a side plate 25-2 which is bent axially inward. Both side plates are formed with ball bearings 29a, 29b at the center thereof, through which a rotational shaft 5 is rotatably supported. A rotor 1 is fixed to the rotational shaft 5 through a supporting member 5-1. Salient poles (not shown) of the rotor 1 have substantially the same construction as the salient poles of the rotor 1 of FIG. 2; A fixed armature C, whose salient poles confront magnetic poles, is fixed to the inside of the outer casing 25-1. The construction of the fixed armature is substantially the same as the fixed armature 16 of FIGS. 2 and 3. Aluminum rotor 3, having a protrusion similar to the rotor 1 in outer peripheral shape, is fixed to the right surface of the rotor 1 so as to rotate together with the rotor 1. The outer peripheral portion faces the coils 10a, 10b and 10c which obtain position detecting signals shown in FIG. 13 as previously described with reference to FIG. 3.

The fixed armatures C and C-1 are arranged in the same phase and fixed to the outer casing 25-1. The rotor 1 has the same construction as the rotor 1 and rotates synchronically with the rotor 1 with a mutual phase difference of 30 degrees with respect to the salient poles of the rotor 1 (equivalent to a 30-degree rotation about an axis). Magnetic poles of the fixed armatures C and C-1 confront salient poles on the outer periphery of the rotor over air gap. The magnetic poles of the fixed armature C-1 are associated with three-phase armature coils, which are referred to as armature coils 39d, 39e and 39f. The armature coils 39d, 39e and 39f are activated by an electric circuit similar to that of FIG. 8 in response to the position detecting signals 51a, 51b, —, 52a, 52b, —, 53a, 53b, —, of FIG. 13, so as to realize a three-phase half-wave current supply mode motor. The fixed armatures C and C-1 thus constitute a three-phase full-wave current supply mode motor.

Previously described fixed armature C-1 is denoted by a reference numeral 16 in FIG. 3, while a rotor is denoted by a reference numeral 1 and its salient poles are denoted by reference numerals 1a, 1b, 1c, —. The salient poles 1a, 1b, 1c, —rotate in synchronism with the salient poles 1a, 1b, 1c, —with a phase difference of 30 degrees. The same purpose will be accomplished by providing a phase difference of 30 degrees between the fixed armatures 16 and 16 while their salient poles are in phase. As the fixed armature 16 has the same construction as the fixed armature 16, the fixed armature 16 is illustrated by a dotted line. In a case that the number of the salient poles is not less than three, the fixed armature is elongated correspondingly to the right side of the dotted line B.

By executing the above-described three-phase full-wave current supply operation, the torque indicated by the curve 33 is added to each of the bottom portions of the output torque curve 27c of FIG. 11. Thus, a composite torque curve obtained is so flattened that the disadvantage is eliminated. A phase difference between the curves 27C and 33 is 30 degrees.

Figure 4:
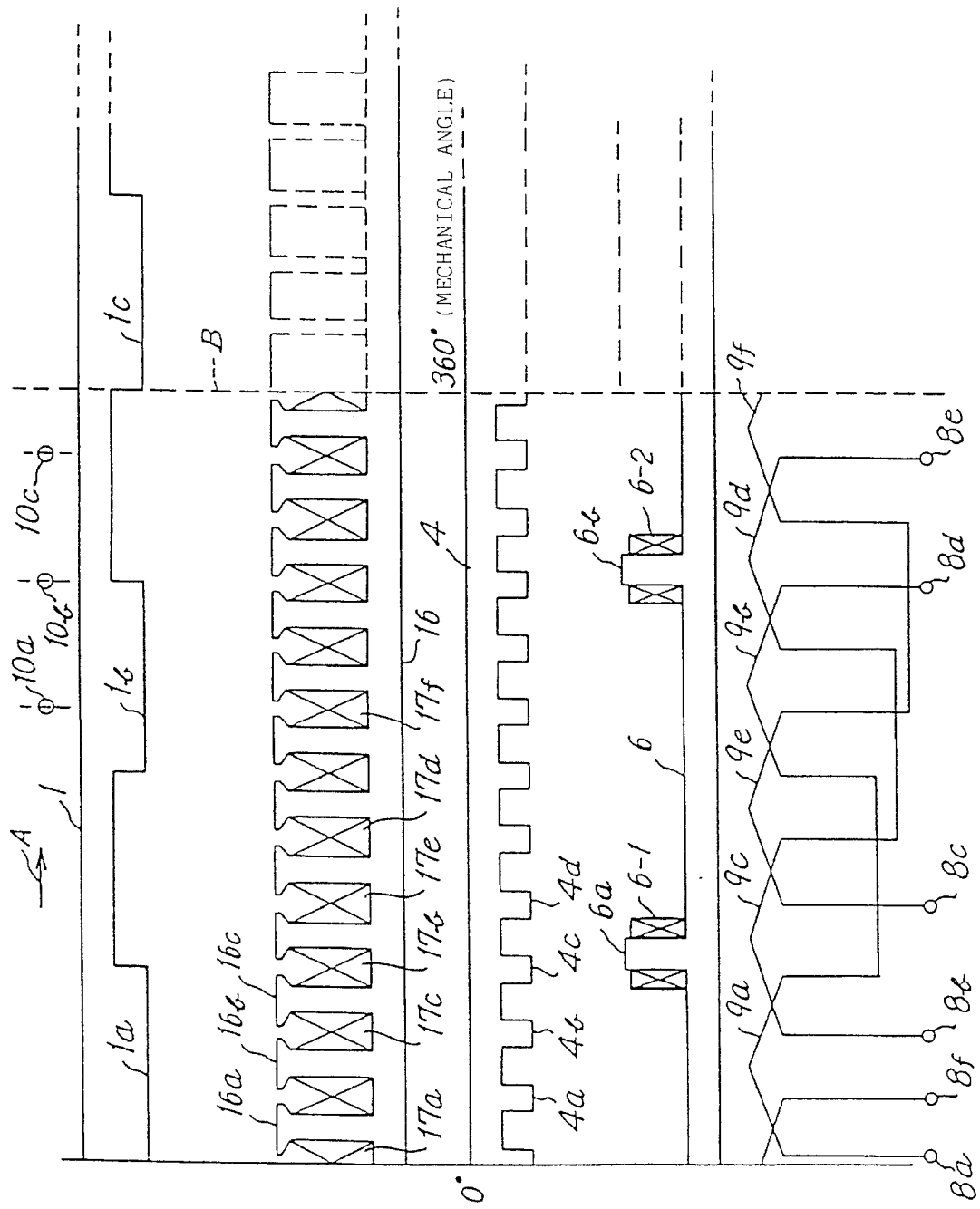
FIG. 4 is a development showing the rotor, fixed armature and armature coils of a three-phase reluctance type motor in accordance with other embodiment of the present invention.

Next, other means for removing the ripple torque will be explained with reference to FIG. 4. The components identical with those of FIG. 3 in their function and effect are suffixed by the same reference numerals and therefore will no more explained. The different point is that the embodiment of FIG. 4 is a three-phase half-wave current supply mode motor comprising only one armature 16 and only one rotor 1. The rotor 4, made of a magnetic member, is coaxial with the rotor 1 and rotates synchronically with the rotor 1. Salient poles 4a, 4b, —are provided so as to protrude from the outer surface of the rotor 4. Salient poles, each having a width of 24 degrees, are spaced 36 degrees from one another. The fixed armature 6 is coaxial with and fixed adjacent to the fixed armature 16 on the inside surface of the outer casing. Magnetic poles 6a and 6b protrude from the inside surface of the fixed armature 6 and confront the salient poles 4a, 4b, —through air gap. The fixed armature 16 and the rotor 4 are made of laminated layers of silicon steel sheets. The magnetic poles 6a and 6b are wound by exciting coils 6-1 and 6-2, respectively, and have a polarity different from each other when magnetized. The magnetic poles 6a and 6b respectively has a width of 30 degrees, which is identical with the number of the salient poles 1a, 1b, —.

It will be allowed to set it identical with the doubled number of the salient poles 1a and 1b.

In the same manner as the embodiments described above, the present embodiment can be constituted by elongating the fixed armature to the right side of the dotted line B to increase the number of the salient poles 1a, 1b and increase the number of the salient poles 4a, 4b, —and the magnetic poles 6a, 6b. As described previously, the output torque curve by the fixed armature 16 and the rotor 1 is the curve 27c shown in FIG. 11 which includes the ripple torque. The torque curve generated by the salient poles 4a, 4b, —of FIG. 4, which is indicated by the dotted line 33a, has a protruding portion at the position corresponding to the bottom portion of the curve 27c. Accordingly, it brings function and effect of flattening the output torque. In determining the mutual phase difference among the salient poles 1a, 1b, —, salient poles 4a, 4b, —, magnetic poles 6a, 6b and the fixed armature 16 of FIG. 4, it is necessary to satisfy the conditions capable of removing the above-described ripple torque. It is possible to dispose another two magnetic poles between the magnetic poles 6a and 6b. In this case, the peak value of the torque indicated by the curve 33 of FIG. 11 is enlarged, thereby reducing the length of the magnetic poles 6a and 6b into approximately ½ in the direction of the rotational axis. Accordingly, it brings the effect of reducing the length of the motor. For example, if the fixed armature C-1 of FIG. 5 is used as the fixed armature 6 of FIG. 4 and the rotor 1 is used as the rotor 4 of FIG. 4, the width of the arrow 29d will be reduced to approximately ½ of the width of arrow 29c. Thus, it becomes possible to shorten the length in the direction of the rotational shaft 5. By increasing ampere-turn of the exciting coils 6-1 and 6-2, the length of the motor will be further shortened.

With reference to FIG. 8, the current supply control means for activating the exciting coils 6-1 and 6-2 will be explained. In FIG. 8, the exciting coils 6-1 and 6-2 are connected in series or in parallel. Both ends of these exciting coils 6-1 and 6-2 are connected to transistors 20g, 20h, and a diode 49-1. A resistor 22d, an absolute-value circuit 30d, an operational amplifier 40e, and a capacitor 47d have the same constitution as those in the current supply control for the armature coils 39a, 39b and 39c described above. Therefore, the same function and effect are given.

The block circuit D represents a position detecting device for the salient poles 4a, 4b, —of FIG. 4. A position detecting coil 10d, having a small diameter, confronts with the side surfaces of the salient poles 4a, 4b, —, so that its impedance is changed due to iron loss to be generated when confronting the salient poles. Therefore, the constitution is the same as the circuit of FIG. 6 and the width of an output of an operational amplifier corresponding to the operational amplifier 13 becomes identical with the width of the salient poles 4a, 4b, —. Its output becomes an input of the AND circuit 41d of FIG. 8. As the other input is an output of the operational amplifier 40e, the current supplied to the exciting coils 6-1 and 6-2 corresponds to the voltage of the reference voltage source 40. It is preferable to adjust the peak value of the torque curve generated by such exciting current, i.e. the peak value of the dotted line 33a of FIG. 11, to be identical with the peak value of the curve 27c.

Although each armature coil of FIG. 8 is controlled by two transistors provided both ends thereof, the present invention can be embodied by providing only one transistor at a negative voltage side of the armature coil.

That embodiment will be explained with reference to FIG. 9.

Figure 9:
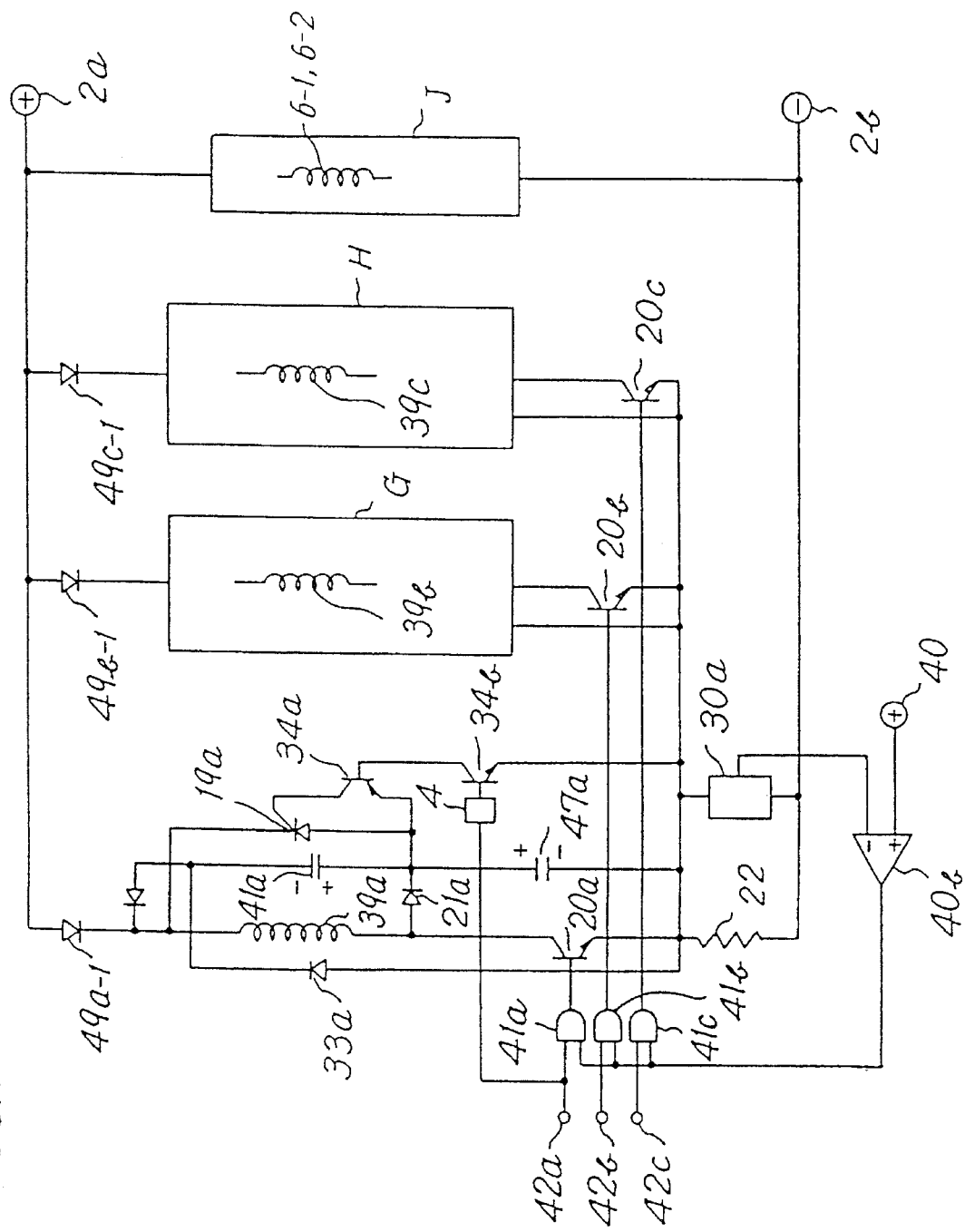
FIG. 9 is a circuit diagram showing another embodiment of a current supply control circuit for the three-phase reluctance type motor.

In FIG. 9, downside ends of the armature coils 39a, 39b and 39c are connected to transistors 20a, 20b and 20c. The transistors 20a, 20b and 20c serve as semiconductor switching elements and can be substituted by other semiconductor elements having the same effect. A DC electric power source supplies electric power from its positive and negative terminals 2a, 2b. This embodiment is characterized by a simplified circuit configuration in which the transistor 20a, 20b or 20c is provided at a lower end of each armature coil, i.e. a negative terminal side of the DC electric power source.

Position detecting signals of curves 48a, 48b, —, curves 49a, 49b, —, and curves 50a, 50b, —in FIG. 13 are inputted from the terminals 42a, 42b and 42c. In response to these input signals fed through AND circuits 41a, 41b, 41c, the transistors 20a, 20b and 20c are turned on to activate the armature coils 39a, 39b and 39c.

A terminal 40 is supplied with a reference voltage specifying an exciting current. By varying a voltage of the terminal 40, an output torque can be changed. When an electric power switch (not shown) is turned on, an output of the operational amplifier 40b becomes a HIGH level since an input of a negative terminal of the operational amplifier 40b is lower than that of its positive terminal. Accordingly, the transistor 20a turns on to supply a voltage to the current supply circuit for the armature coil. A resistor 22 and an absolute-value circuit 30a are provided for detecting armature current flowing in the armature coils 39a, 39b and 39c.

This embodiment adopts the following means in order to suppress the above-described counter torque and torque reduction and to provide a high-speed and large-torque motor.

An apparatus in accordance with the present embodiment is characterized in that the above-mentioned disadvantage is eliminated by additionally providing a small-capacitance capacitor 47a, a diode 21a, semiconductor elements 19a, 34b and 34b and others shown in FIG. 9, and only one semiconductor switching element (20a, 20b or 20c) for controlling activation/deactivation of each armature coil is provided at a negative voltage side of the armature coil.

When current supply is stopped at the terminal end of the position detecting signal curve 25a, magnetic energy stored in the armature coil 39a is discharged through the diodes 21a, 33a to the capacitor 47a so as to charge it up to a high voltage with polarities shown in the drawing, being prevented from returning to the DC electric power source. Accordingly, magnetic energy is sharply extinguished and current decreases steeply.

Curves 26a, 26b and 26c shown in the upper part of the time chart of FIG. 7 cooperatively represent a curve of current flowing in the armature coil 39a. Both dotted lines 26-1 and 26-2 are spaced 120 degrees. The exciting current decreases steeply like the curve 26b and therefore no counter torque is generated. The capacitor 47a is charged up to a high voltage and held at this voltage. For controlling the armature coils 39b and 39c, the current supply control circuits having the same construction as that for the armature coil 39a is used. These circuits are indicated as the block circuits G and H. Accordingly, the generation of the above-described counter torque is suppressed. Next, in response to the position detecting signal of curve 48b, the transistor 20a is turned on to activate the armature coil 39a again. A voltage equivalent to a summation of the charged voltage of the capacitor 47a and the DC electric power source voltage (a voltage between the terminals 2a, 2b) is applied to the armature coil 39a in this case; therefore an exciting current of the armature coil 39a builds up sharply. The reason will be explained below. A differential pulse of an initial end of the position detecting signal 48b is obtained from the block circuit 4 of FIG. 9. A monostable circuit inputting this differential pulse produces an electric pulse having a short width. In response to this electric pulse, the transistors 34b, 34a and SCR 19a turn on. High voltage of the capacitor 47a is applied to the armature coil 39a; thus, the exciting current builds up sharply. Thereafter, a current shown by the curve 26a (FIG. 7) is obtained by the DC electric power source. Upon termination of discharge of the capacitor 47a, the SCR 19a is turned off.

As explained above, generation of torque reduction and counter torque can be avoided. Furthermore, as the waveform of current becomes a rectangular shape, an output torque is increased. Current supply control for another armature coils 39b and 39c is executed in the same manner and, therefore, its function and effect is similar too.

Next, a chopper circuit will be explained. When the exciting current of the armature coil 39a increases and therefore the voltage drop in the resistor 22 and absolute-value circuit 30a, which detect the armature current value, increases to exceed the reference voltage of the reference voltage terminal 40 (i.e. an input voltage of the positive terminal of the operational amplifier 40b), a downside input of the AND circuit 41a turns to a LOW level. Thus the transistor 20a is turned off and an exciting current is reduced. Due to hysteresis characteristics of the operational amplifier 40b, an output of the operational amplifier 40b resumes a HIGH level as a result of a predetermined reduction. Thus, the transistor 20a turns on and the exciting current increases. Repetition of such a cycle causes the exciting current to be maintained at a predetermined value. A section indicated by a curve 26c of FIG. 7 is a section where chopper control is carried out. The height of the curve 26c is regulated by the voltage of the reference voltage terminal 40. The armature coil 39b of FIG. 9 is activated by the transistor 20b which is turned on in accordance with the width of the position detecting signal curves 49a, 49b, —inputted from the terminal 42b. And, the chopper control is carried out by the operational amplifier 40b, resistor 22, absolute-value circuit 30a and AND circuit 41b. The above-described circumstances are applied to the armature coil 39c. That is, the current supply control for the armature coil 39c is executed by inputting the position detecting signal curves 50a, 50b, —of FIG. 13 to the terminal 42c. Function and effect of transistor 20c, AND circuit 41c, operational amplifier 40b, resistor 22, and absolute-value circuit 30a are substantially identical with like components previously described. The charge voltage is increased with reducing capacitance of the capacitor 47a; therefore the exciting current of the armature coil can build up sharply and reduce steeply. The motor can thus operate at a high-speed region and the disadvantage, i.e. low speed, of the conventional reluctance type motor can be eliminated. The capacitance of the capacitor should be selected small as far as the charged voltage does not damage transistors in the circuit.

The block circuit J is an electric circuit for controlling current supplied to the exciting coils 6-1 and 6-2, which is identical with the current supply control circuit for the exciting coils 6-1 and 6-2 of FIG. 8. Therefore, the block circuit J has function and effect of removing the ripple torque, thus accomplishing the purpose of the present invention.

Next, details of the current supply control circuit of the present invention for activating/deactivating armature coils based on the three-phase full-wave current supply mode explained in FIG. 3 will be explained with reference to FIG. 10.

Figure 10:
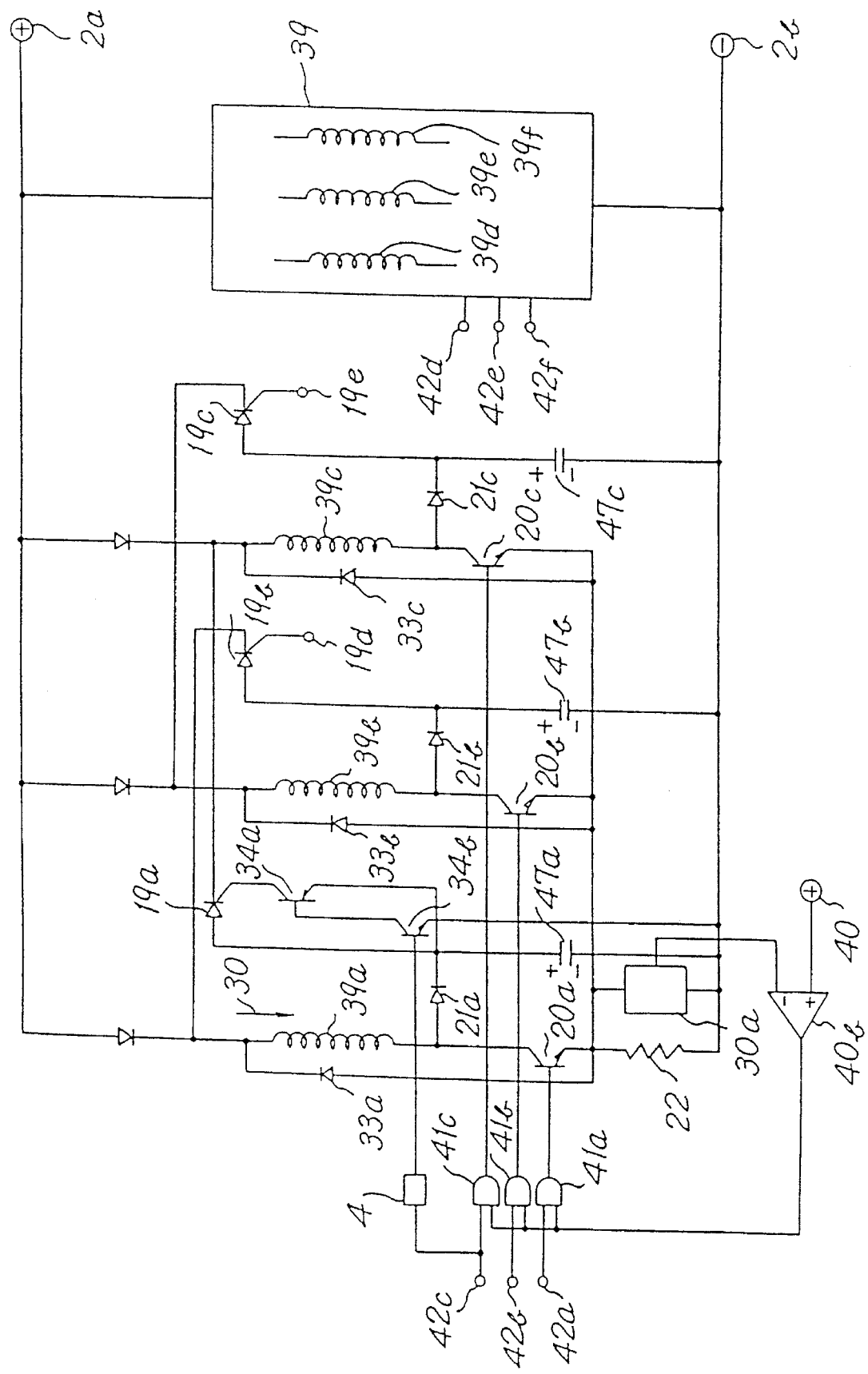
FIG. 10 is a circuit diagram showing a current supply control circuit for the three-phase full-wave current supply mode reluctance type motor.

In FIG. 10, position detecting signals inputted through the terminals 42a, 42b and 42c are represented by the curves 48a, 48b, —, curves 49a, 49b, —and curves 50a, 50b, —in FIG. 13. When an input is received through the terminal 42a, the transistor 20a is turned on through the AND circuit 41a to activate the armature coil 39a. Thereafter, by the chopper function of the resistor 22, absolute-value circuit 30a and operational amplifier 40b, the exciting current of the armature coil is controlled to be responsive to the reference voltage of the terminal 40.

When the input to the terminal 42a is extinguished, the transistor 20a is turned off and magnetic energy stored in the armature coil 39a is discharged through the diodes 21a, 33a into the capacitor 47a to charge it up to a high voltage. As the capacitor 47a was charged repeatedly by a small amount even when chopper operation as described previously was performed, the charge voltage of the capacitor 47a increases in response to the addition of the magnetic energy. The resultant charge voltage should be adjusted by taking account of the withstanding voltage of the transistors to be used.

When the transistor 20b is turned on in response to an input fed through the terminal 42b, current supply controlling is carried out by chopper operation. When the transistor 20b is turned off, magnetic energy stored in the armature coil 39b is discharged through the diodes 21b, 33b into the capacitor 47b to charge it up to a high voltage.

When the transistor 20c is turned on in response to an input fed through the terminal 42c, current supply controlling is carried out by chopper operation. When the transistor 20c is turned off, magnetic energy stored in the armature coil 39c is discharged through the diodes 21c, 33c into the capacitor 47c to charge it up to a high voltage.

As the transistors 34b, 34a and SCR 19a are turned on in response to an output signal of the block circuit 4 (a circuit including a monostable circuit responding to a differential pulse) in an initial stage of the input signal fed from the terminal 42a, high voltage of the capacitor 47a is applied to the armature coil 39c, thereby sharply building up the current. Electric pulses obtained in the initial stage of the input signals fed from the terminals 42a, 42b are respectively given to the terminals 19d, 19e through the similar means. Accordingly, high voltage of the capacitors 47b, 47c is applied to the armature coils 39a, 39b, thereby sharply building up the current.

As understood from the foregoing description, a highly efficient motor capable of rotating fast without counter torque and torque reduction can be obtained in the same manner as the previous embodiments.

The armature coils 39d, 39e and 39f represent No. 1-, No. 2- and No. 3-phase armature coils associated with the fixed armature 16 of FIG. 3. The block circuit 39 is the same electric circuit as that of the armature coils 39a, 39b and 39c, which controls current supplied to the armature coils 39d, 39e and 39f in response to the position detecting signals inputted through the terminals 42d, 42e and 42f.

As the input signals of the terminals 42d, 42e and 42f are curves 51a, 51b, —, curves 52a, 52b, —and curves 53a, 53b, —of FIG. 13, respectively, each corresponding armature coil is controlled by the three-phase half-wave current supply mode. Output torque by the armature coils 39d, 39e and 39f is delayed 30 degrees from the output torque by the armature coils 39a, 39b and 39c; therefore, it brings function and effect of eliminating the ripple torque as explained with reference to FIG. 3.

Next another embodiment will be explained, which is a two-phase full-wave current supply mode reluctance type motor incorporating the means of the present invention.

Figure 14:
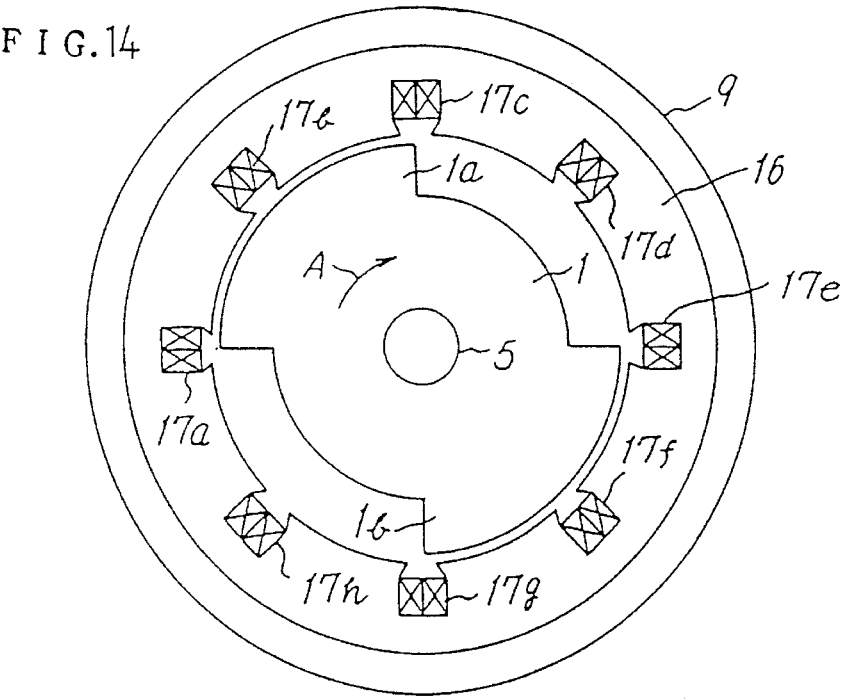
FIG. 14 is a cross-sectional view showing a fixed armature and a rotor of a two-phase full-wave reluctance type motor.

FIG. 14 is a plan view showing a fixed armature and a rotor. In FIG. 14, a reference numeral 1 represents a rotor which is equipped with salient poles 1a and 1b having the same width of 180 degrees (i.e. 90 degrees in terms of mechanical angle) and disposed with 360-degree phase difference in equal pitch. The rotor 1 is made of well-known laminated layers of silicon steel sheets. A reference numeral 5 denotes a rotational shaft 5. A fixed armature 16 is provided with 8 slots 17a, 17b, —, being mutually spaced at regular intervals. A reference numeral 9 represents a cylinder serving as an outer casing.

The slots 17a, 17c and 17e, 17g are respectively wound by one coil. Two coils are connected in series or parallel to constitute a No. 1-phase armature coil. This embodiment connects these two coils in series.

The slots 17b, 17d and 17f, 17h are respectively wound by one coil. These two coils are connected in series to constitute a No. 2-phase armature coil. And, the slots 17c, 17e and 17g, 17a are respectively wound by one coil. These two coils are connected in series to constitute a No. 3-phase armature coil.

The slots 17d, 17f and 17h, 17b are respectively wound by one coil. These two coils are connected in series to constitute a No. 4-phase armature coil.

In general, a two-phase motor consists of No. 1- and No. 2-phase armature coils. Assuming that current supply of each phase has 180-degree phase difference from one another, the No. 1-phase includes a set of two armature coils and No. 2-phase is includes a set of two armature coils. These are referred to as No. 1- and No. 3-phase armature coils and No. 2- and No. 4-phase armature coils. An order of current supply is No. 1-phase→No. 2-phase→No. 3-phase→No. 3-phase. By repeating this cycle, an output torque can be obtained.

An arrow A denotes a rotational direction of the rotor 1. Salient poles 1a, 1b have an angular width of 90 degrees in terms of mechanical angle, and are spaced with each other at the same interval.

Figure 15:
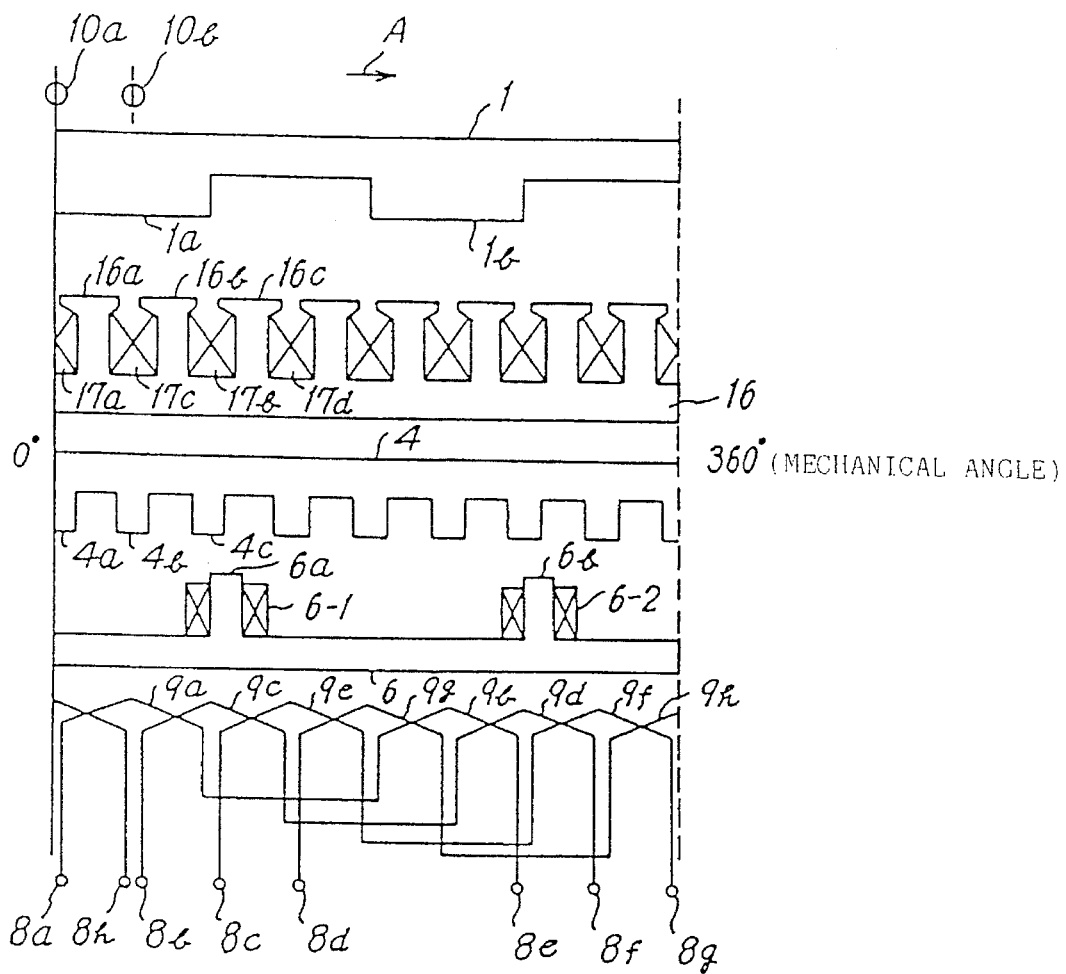
FIG. 15 is a development showing the rotor, fixed armature and armature coils of the two-phase full-wave reluctance type motor in accordance with the present invention.

FIG. 15 is a development showing the rotor 1 and the armature coils.

In FIG. 15, armature coils 9a, 9b correspond to the No. 1-phase armature coil described above. Armature coils 9c, 9d, armature coils 9e, 9f and armature coils 9g, 9h correspond to the No. 2-, No. 3- and No. 4-phase armature coils described above. Reference numerals 8a, 8e, and 8b, 8f, and 8c, 8g and 8d, 8h represent extracted terminals for the No. 1-, No. 2-, No. 3- and No. 4-phase armature coils.

The fixed armature 16 is made of laminated layers of silicon steel sheets as well as the rotor 1.

In FIG. 15, reference numerals 17a, 17b, —denote slots associated with No. 1-, No. 2-, No. 3- and No. 4-phase armature coils, while reference numerals 16a, 16b, —denote magnetic poles corresponding to these slots.

Hereinafter, the above-described No. 1-, No. 2-, No. 3- and No. 4-phase armature coils are referred to as armature coils 32a, 32b, 32c and 32d, respectively.

When the armature coil 32c is activated, the salient poles 1a, 1b are magnetically attracted and the rotor 1 rotates in the direction of an arrow A. When the rotor 1 rotates 90 degrees, the armature coil 32c is deactivated and the armature coil 32d is activated. When the rotor 1 further rotates 90 degrees, the armature coil 32d is deactivated and the armature coil 32a is activated. A current supply mode is cyclically alternated every 90-degree rotation in the order of the armature coil 32a→the armature coil 32b→the armature coil 32c→the armature coil 32d→, thereby driving the motor as a two-phase full-wave motor. In this case, symmetrically disposed magnetic poles are magnetized as N-poles and S-poles. Two magnetic poles to be excited simultaneously are always magnetized so that they have opposite polarities, so, leaking magnetic fluxes passing through non-excited magnetic poles directs in the opposite directions, therefore, generation of counter torque is prevented.

Figure 16:
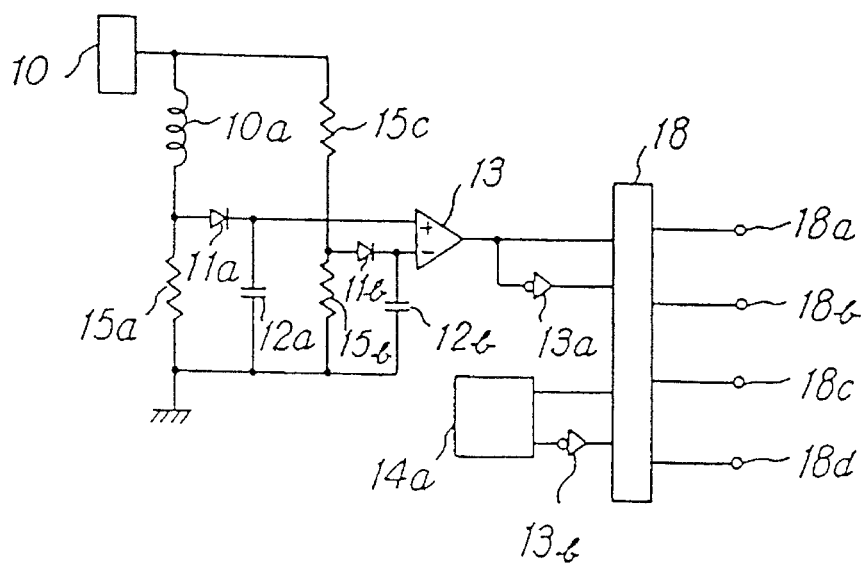
FIG. 16 is a diagram showing an electric circuit obtaining position detecting signals of the two-phase full-wave reluctance type motor.

Coils 10a and 10b are position detecting elements for detecting positions of the salient poles 1a and 1b, and are fixed on the armature 16 as shown in the drawings. Their coil surfaces face the side surfaces of the salient poles 1a and 1b over air gap. The coils 10a and 10b are spaced one another by an amount of 90 degrees. The coil is of a 30-turn air-core having a diameter of 5 mm. FIG. 16 shows a device for obtaining position detecting signals from the coils 10a and 10b. In FIG. 16, the coil 10a and resistors 15a, 15b and 15c constitute a bridge circuit. This bridge circuit is adjusted to be balanced when the coil 10a does not directly confront with the salient poles 1a, 1b. Accordingly, an output of a low-pass filter consisting of a diode 11a and a capacitor 12a and an output of a low-pass filter consisting of a diode 11b and a capacitor 12b are equal with each other and, therefore, an output of the operational amplifier 13 becomes a LOW level. A reference numeral 10 denotes an oscillator which causes approximately 1 MHz oscillation. When the coil 10a directly confront the salient poles 1a, 1b, —, an impedance is reduced due to iron loss (i.e. eddy loss and hysteresis loss). Therefore, a voltage drop in the resistor 15a becomes large and thus the output of the operational amplifier 13 becomes a HIGH level.

Figure 18:
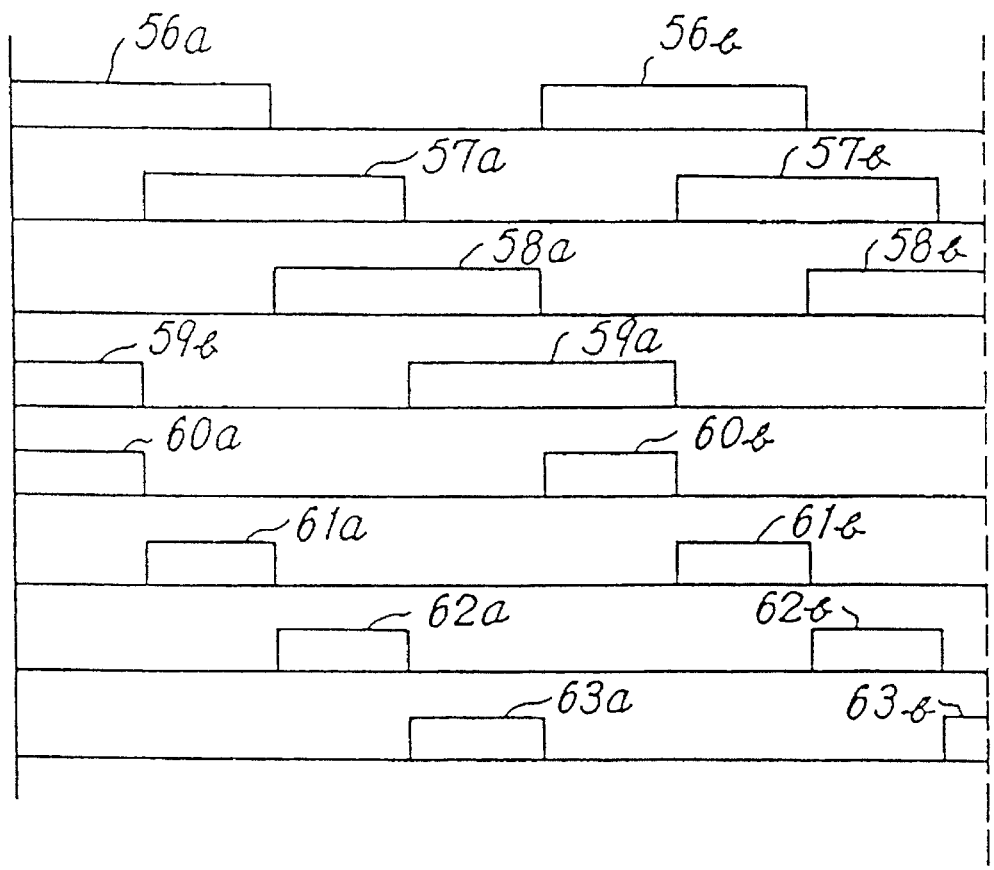
FIG. 18 is a time chart showing position detecting signal curves of the two-phase full-wave reluctance type motor.

Inputs to the block circuit 18 are shown by curves 56a, 56b, —in a time chart of FIG. 18, and inputs supplied through an inversion circuit 13a are shown by the curves 58a, 58b, —which are inverted curves of the curves 56a, 56b, —. The block circuit 14a in FIG. 16 includes the coil 10b and has the same constitution as the above-described circuit. The oscillator 10 can be utilized commonly among these block circuits. An output of the block circuit 14a and an output of the inversion circuit 13b are inputted into the block circuit 18, and their output signals become curves 57a, 57b, —and curves 59a, 59b, —which are inverted curves of the curves 57a, 57b, as shown in the time chart of FIG. 18. The curves 57a, 57b, —are delayed 90 degrees in their phases with respect to the curves 56a, 56b, —. An output of the AND circuit having two input signals of the curves 56a, 56b, —and curves 59a, 59b, —is obtained as curves 60a, 60b, —. An output of the AND circuit having two input signals of the curves 56a, 56b, —and curves 57a, 57b, —is obtained as curves 61a, 61b, —. Curves 62a, 62b, —and curves 63a, 63b, —are obtained by the same means.

The above-described circuit is shown as the block circuit 18. Outputs of the terminals 18a, 18b, —are signals represented by the curves 60a, 60b, —and the lower part curves, respectively.

The same purpose will be accomplished when an aluminum plate having the same configuration as the rotor 1 is used instead of the rotor 1 of FIG. 15 confronting the coils 10a and 10b.

Figure 17:
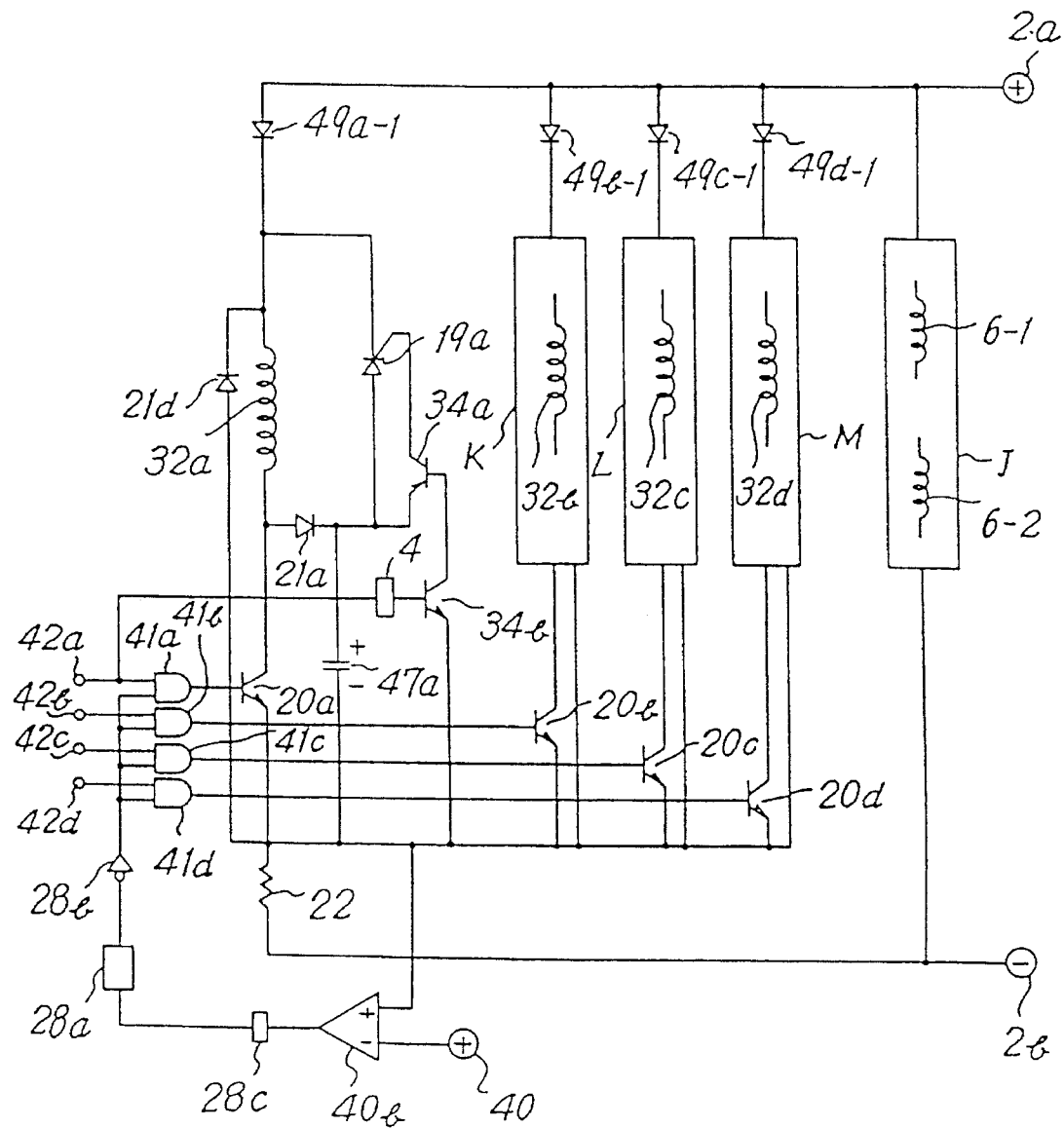
FIG. 17 is a circuit diagram showing a current supply control circuit for the two-phase full-wave reluctance type motor.

Next, a means for supplying current to the armature coils will be explained with reference to FIG. 17. Lower ends of the armature coils 32a, 32b, 32c and 32d are connected with transistors 20a, 20b, 20c and 20d. The transistors 20a, 20b, 20c and 20d serve as semiconductor switching elements and can be substituted by other semiconductor elements having the same effect. A DC electric power source supplies electric power from its positive and negative terminals 2a, 2b. This embodiment is characterized by a simplified circuit configuration in which the transistor 20a, 20b, 20c or 20d is provided at a lower end of each armature coil, i.e. a negative terminal side of the DC electric power source.

Details of the current supply circuit will be explained with reference to FIG. 17. Position detecting signals of curves 60a, 60b, —, curves 61a, 61b, —, curves 62a, 62b, —and curves 63a, 63b, —of FIG. 18 are inputted from the terminals 42a, 42b, 42c and 42d.

In response to these input signals fed through AND circuits 41a, 41b, 41c and 41d, the transistors 20a, 20b, 20c and 20d are turned on to activate armature coils 32a, 32b, 32c and 32d.

A terminal 40 is supplied with a reference voltage specifying an armature current. By changing a voltage of the terminal 40, an output torque can be changed. When an electric power switch (not shown) is turned on, an output of an operational amplifier 40b becomes a LOW level since an input of a positive terminal of the operational amplifier 40b is lower than that of its negative terminal. As an input of an inversion circuit 28b is a LOW level, an output of the inversion circuit 28b becomes a HIGH level. Accordingly, the transistor 20a is turned on, thereby applying a voltage to the current supply control circuit of the armature coil. A resistor 22 is provided for detecting armature current flowing through the armature coils 32a, 32b, 32c and 32d.

Block circuits K, L and M represent electric circuits for controlling activation/deactivation of the armature coils 32b, 32c and 32d, respectively, which have the same constitution as the circuit of the armature coil 32a.

In the reluctance-type motor, building up of the armature current is delayed at the initial part of the position detecting signal and the trailing of the armature current is delayed at the terminal end of the position detecting signal. The former causes torque reduction and the latter causes counter torque. This is because the magnetic poles and the salient poles interact to close the magnetic path to have a large inductance. Although the reluctance type motor has a disadvantage in that it cannot increase the rotational speed notwithstanding an advantage of large output torque, such a disadvantage derives from the above-described counter torque and torque reduction. An apparatus in accordance with the present invention is characterized in that the abovementioned disadvantage is eliminated by additionally providing back-flow preventing diodes 49a-1, 49b-1, —, a small-capacitance capacitor 47a, diodes 21a, 21d, semiconductor elements 34a, 34b and others shown in FIG. 17, and only one semiconductor switching element (20a, 20b, 20c or 20d), controlling activation/deactivation of each armature coil, is provided at a negative voltage side of the DC electric power source. In this embodiment, the position detecting signals of 90-degree width indicated by the curves 60a, 60b, —, curves 61a, 61b, —, the curves 62a, 62b, —, curves 63a, 63b, —are inputted from the terminals 42a, 42b, —.

When current is terminated at the terminal end of the signal curve 60a inputted from the terminal 42a, magnetic energy stored in the armature coil 32a is discharged through the diode 21a to the capacitor 47a so as to charge it up to a high voltage with polarities shown in the drawing. Accordingly, magnetic energy is sharply extinguished and the current decreases steeply.

When the position detecting signal of the curve 60b is inputted from the terminal 42a, the transistor 20a is turned on to activate the armature coil 32a. A block circuit 4 includes a monostable circuit responding to a differential pulse of the initial part of the curve 60b. Therefore, the transistors 34b, 34a and SCR 19a are turned on in response to an electric pulse of the initial part of the input of the terminals 42a. Thus, high voltage of the capacitor 47a is applied to the armature coil 32a, thereby building up the current sharply. The above-described discharge current to the capacitor 47a is prevented from being returned to the DC electric power source by the function of the back-flow preventing diode 49a-1.

During the above-described current supply operation to the armature coil 32a, a voltage equivalent to a summation of the charged voltage of the capacitor 47a and the DC electric power source voltage (a voltage between the terminals 2a, 2b) is applied to the armature coil 32a. Therefore an exciting current of the armature coil 32a builds up sharply. The building-up portion of the current becomes slow or moderate at its intermediate portion, because magnetic energy is transformed into thermal energy due to copper loss of coils and iron loss of magnetic cores when the magnetic energy is transferred between armature coils. A countermeasure for eliminating such a disadvantage will be discussed later. As is explained above, torque reduction and counter torque are removed. And, as the exciting current becomes substantially the rectangular waveform, an output torque is increased.

Block circuits K, L and M represent electric circuits for controlling activation/deactivation of the armature coils 32b, 32c and 32d, respectively, which have the same constitution as the circuit of the armature coil 32a and therefore have the similar function and effect.

The armature coils 32b, 32c and 32d are activated successively by 90-degree current supply in response to the position detecting signals of the curves 61a, 61b, —curves 62a, 62b, —and curves 63a, 63b, —fed from the terminals 42b, 42c and 42d.

Next, a chopper circuit will be explained. When the armature current of the armature coil 32a increases and therefore the voltage drop in the resistor 22, which detects an armature current value, increases to exceed the reference voltage of the reference voltage terminal 40 (i.e. an input voltage of the negative terminal of the operational amplifier 40b), an output of the operational amplifier 40b turns to a HIGH level. Accordingly, the differential circuit 28c generates a differential pulse to activate the monostable circuit 28a, which produces an electric pulse signal having a predetermined width. As an output signal of the inversion circuit 28b is converted into a LOW level during the time corresponding to that width, an output of the AND circuit 41a becomes a LOW level during the same time, with the result that the transistor 20a is deactivated during the same time. Accordingly a current flowing in the armature coil (i.e. armature current) reduces, and then this current flows in through the diode 21a into the capacitor 47a to charge it up. When the output signal of the monostable circuit 28a extinguishes, the outputs of the inversion circuit 28b and the AND circuit 41a return to a HIGH level. Therefore, the transistor 20a turns on to increase the armature current of the armature coil.

When the armature current exceeds a predetermined value, an output of the operational amplifier 40b turns again to a HIGH level. The transistor 20a turns off during a predetermined period of time corresponding to the output pulse width of the monostable circuit 28a. Thus, the armature current reduces. Repetition of such a cycle constitutes a chopper circuit in which the armature current is maintained at a predetermined level regulated by the reference voltage of the reference voltage terminal 40. It is also possible to realize a constant speed control by means of a conventional means which controls the reference voltage of the reference voltage terminal 40 by a voltage varying in proportion to the rotational speed.

During the above-described chopper operation, the capacitor 47a is repeatedly charged in response to output pulses from the monostable circuit 28a so as to increase its charged voltage so that electrostatic energy is stored. When the transistor 20a is turned off at the terminal end of a position detecting signal, all the magnetic energy stored in the armature coil 32a is charged in the capacitor 47a.

Another electrostatic energy, corresponding to chopper frequency and current attenuation time, is further added to the electrostatic energy of the capacitor 47a.

This large amount of electrostatic energy can compensate energy loss caused by previously described copper loss of armature coils and iron loss of magnetic poles, in the building-up of armature current when the armature coil 32a is next activated. Accordingly, the armature current builds up so steeply that its waveform becomes substantially rectangle. Therefore, it brings the function and effect of increasing the output torque. Capacitance of the capacitor 47a, frequency of chopper current, and output pulse width of the monostable circuit 28a need to be adjusted so as to bring the above-described function and effect.

AND circuits 41b, 41c, 41d and transistors 20b, 20c, 20d also perform chopper control of armature current to be supplied to the armature coils 32b, 32c, 32d.

Current supply to each armature coil can be initiated at any time within an approximately 45-degree section starting from the time when the salient poles come to confront the magnetic poles. An adjustment is carried out by taking account of rotational speed, efficiency, and output torque to change the fixing positions of the detecting coils 10a and 10b being fixed on the armature for serving as position detecting elements. As understood from the foregoing explanation, a motor can rotate at a high speed with a large output and good efficiency, thereby accomplishing the purpose of the present invention.

Voltage charged of the capacitor 41a increases with reduction of its capacitance. Therefore, with small-capacitance capacitor 41a, the exciting current of the armature coil can be built up sharply and reduced steeply. The motor can thus rotate in a high-speed region and the disadvantage, i.e. low speed, of the conventional reluctance type motor can be eliminated. It is preferable to select the capacitance of the capacitor as small as possible, provided that the transistors in the circuit are not damaged.

Figure 19:
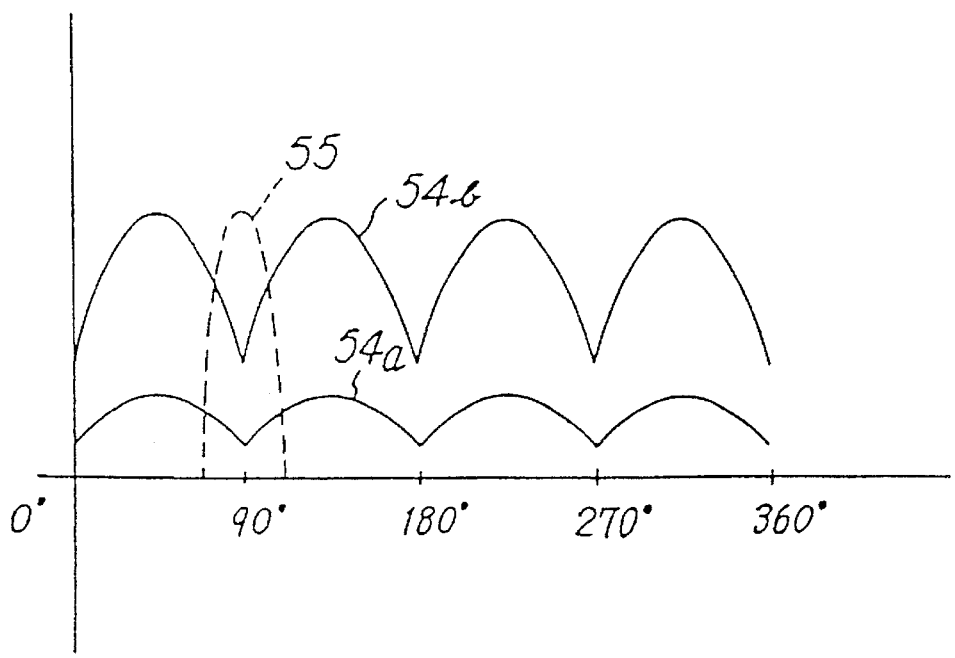
FIG. 19 is a graph showing output torque curves of the two-phase full-wave reluctance type motor.

A graph of FIG. 19 shows output torque curves in accordance with current supply mode of the two-phase reluctance motor. As the current supply of armature coils is alternated every 90-degree rotation, the torque curve is disadvantageously caused to have concave portions at the alternating points as indicated by curves 54a and 54b. Such a disadvantage is eliminated by the means of the present invention. Details of that will be explained next.

In FIG. 15, a rotor 4 is coaxial with the rotor 1 and rotates synchronically with the rotor 1. Salient poles 4a, 4b, —are provided on the rotor 4 so as to protrude from the rotor 4, which is made of laminated layers of silicon steel sheets. A fixed armature 6 is secured to the outer casing so as to be disposed in parallel with the fixed armature 16. Magnetic poles 6a and 6b protrude from the inside surface of the fixed armature 6 and are wound by exciting coils 6-1, 6-2. The fixed armature 6 is made by the same means as the fixed armature 16. The salient poles, each having a width of 18 degrees, are spaced 27 degrees from one another.

A means for supplying current to the exciting coils 6-1 and 6-2 is similar to that of the previously explained embodiments; that is, the current supply control means for the exciting coils 6-1 and 6-2 explained with reference to FIG. 8 is used. This means is indicated by the block d in FIG. 17. Relative positions of components are adjusted in such a manner that, when the salient poles 4a, 4b, —rotate in the direction of the arrow A, the torque curve generated by the magnetic poles 6a and 6b creates a peak at the position corresponding to the concave portion of the torque curve 54b of FIG. 19, as indicated by the dotted line 55. Hence, the composite torque curve is flattened, thus the purpose of the present invention is accomplished. The present invention can be embodied by the similar means even if the number of the salient poles is not less than three.

Figure 20:
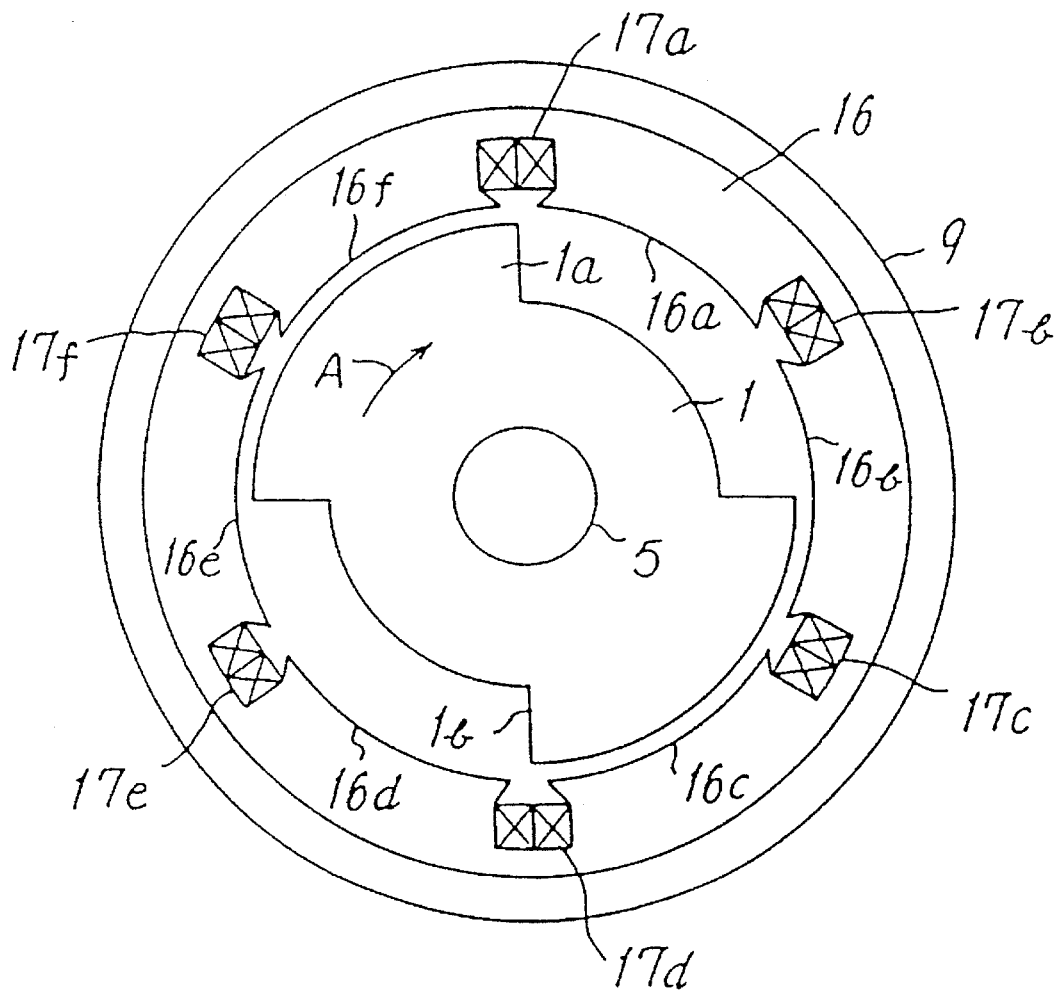
FIG. 20 is a cross-sectional view showing a fixed armature and a rotor of a three-phase reluctance type motor in accordance with the present invention.

In FIG. 20, a cylindrical fixed armature 16 is secured to the inside of an outer casing 9. The fixed armature 16 is made of well-known laminated layers of silicon steel sheets, and has an inner peripheral surface provided with 6 slots being mutually spaced at regular intervals. Each slot is wound by an armature coil. The slots 17a, 17b, which are two slots spaced 120 degrees in terms of electric angle, are respectively wound by an armature coil. In the following explanation, all the angles will be expressed by electric angle. The slots 17b, 17c and the slots 17c, 17d are respectively wound by an armature coil. Other armature coils are constituted similarly, so as to be wound around the adjacent slots.

A rotational shaft 5 is rotatably supported by bearings provided on the both sides of the outer casing 9. A magnetic rotor 1 is fixed to the rotational shaft 5. The magnetic rotor 1 is made of the same laminated layers of silicon steel sheets as the fixed armature 16.

The rotor 1 is provided with salient poles 1a and 1b protruding from the outer peripheral surface of the rotor 1. These salient poles 1a and 1b have 180-degree width and are spaced 180 degrees from one another. The outer peripheral surface of the rotor 1 confronts with the magnetic poles 16a, 16b, —through the air gap of approximately 0.5 mm.

Figure 21:
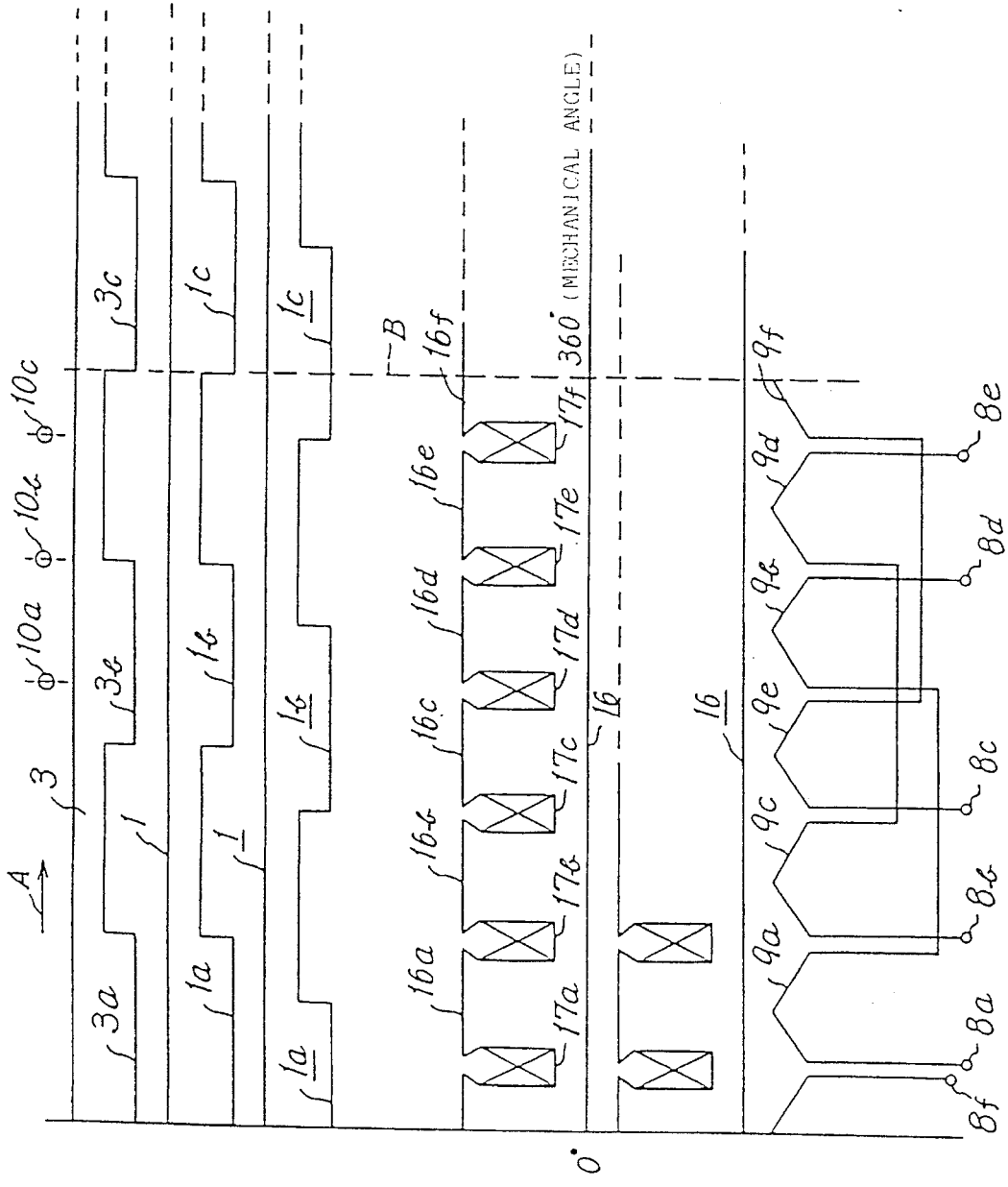
FIG. 21 is a development showing the rotor, fixed armature and armature coils of the three-phase reluctance type motor in accordance with the present invention.

FIG. 21 is a development of FIG. 20. The left side of the dotted line B corresponds to the development of FIG. 20. The rotor is represented by a reference numeral 1 while the fixed armature is represented by a reference numeral 16.

In FIG. 21, an armature coil wound around the slots 17a and 17b is shown as an armature coil 9a in the bottom of the drawing. An armature coil wound around the slots 17b and 17c is shown as an armature coil 9c. In the same manner, other armature coils are denoted by reference numerals 9e, 9b, 9d and 9f. The armature coils 9a and 9b are connected in series and are supplied with electric power from the terminals 8a and 8d. The armature coils 9c, 9d and the armature coils 9e, 9f are connected in series and are supplied with electric power from the terminals 8b, 8e and 8c, 8f, respectively. Armature coils are spaced 120 degrees from one another. The armature coils 9a, 9b, the armature coils 9c, 9d and the armature coils 9e, 9f constitute No. 1-, No. 2- and No. 3-phase armature coils, respectively.

If the No. 1-phase armature coils 9a, 9b are activated when the rotor 1 shifts 120 degrees left and stops there, the salient poles 1a, 1b are magnetically attracted by the magnetic poles 16a and 16d so that the rotor 1 rotates in the direction of an arrow A. When the rotor 1 rotates 120 degrees, the armature coils 9a, 9b are deactivated and the armature coils 9c, 9d (No. 2-phase armature coil) are activated to rotate the rotor 1 right. When the rotor 1 further rotates 120 degrees, the armature coils 9c, 9d are deactivated and the No. 3-phase armature coils 9e, 9f are activated to further rotate the rotor 1 right. As can be understood from the foregoing description, when the No. 1-, No. 2- and No. 3-phase armature coils are successively activated by current supply of 120-degree width, the rotor 1 rotates in the direction of the arrow A, thus acting as a three-phase half-wave current mode reluctance type motor.

It is possible to add another salient-pole 1c to provide a total of three salient poles. In such a case, the dotted line B would shift 360 degrees right. The number of salient poles can be any one not less than 2. The output torque will be enlarged with increasing number of salient poles. Although the motor shown FIG. 1 has six salient poles 1a, 1b, —, only two of these six contribute to generating an output torque. Meanwhile, according to the arrangement of the present invention, the output torque is obtained from six salient poles, with the result that an increase of the output torque by three times can be realized.

The conventional motor shown in FIG. 1 causes deformation because the fixed armature 16 receives magnetic attraction forces acting in the directions of arrows 4-1, 4-4 as a result of interaction with the salient poles 1a, 1e. After rotation of 120 degrees, deformation is then caused by the attraction forces at the salient poles 1b, If in the directions of arrows 4-2, 4-5. After further rotation of 120 degrees, deformation is caused by the attraction forces in the directions of arrows 4-3, 4-6. Hence, the rotation of the fixed armature 16 changes the direction of deformation synchronically, so that vibration is disadvantageously generated. On the other hand, in the present invention, attraction forces generate from all the salient poles simultaneously. The fixed armature 16 therefore receives only a compression force acting along a circumferential direction and hence causes no deformation. Thus, vibration will be effectively suppressed.

Regarding the polarity of the magnetic poles to be magnetized by armature coils, magnetization is such that magnetic poles disposed symmetrically about axis in FIG. 20 have opposite polarities with each other.

Next, a current supply means for activating armature coils driven by the fixed armature 16 confronting the rotor 1 shown in FIG. 21 will be explained.

In FIG. 21, the armature coils 9a, 9b are referred to as an armature coil 39a, and the armature coils 9c, 9d and the armature coils 9e, 9f are referred to as armature coils 39b and 39c, respectively.

The rotor 3 of FIG. 21 is constituted to be coaxial with the rotor 1 and synchronously rotates with the rotor 1. The rotor 3 can be made of conductive material such as aluminum. The salient poles 3a, 3b, 3c—have a width of 180 degrees, and rotate with the mutual phase shown in the drawing.

Coils 10a, 10b and 10c are position detecting elements for detecting positions of the salient poles 3a, 3b, —and are fixed on the armature 16 as shown in the drawings. Their coil surfaces face the side surfaces of the salient poles 3a, 3b, —over air gap. The coils 10a, 10b and 10c are spaced 120 degrees from one another. The coil is of a 30-turn air-core having a diameter of 5 mm. FIG. 6 shows a device for obtaining position detecting signals from these coils 10a, 10b and 10c. In FIG. 6, the coil 10a and resistors 15a, 15b and 15c constitute a bridge circuit. This bridge circuit is adjusted to be balanced when the coil 10a does not directly confront the salient poles 3a, 3b, —. Accordingly, an output of a low-pass filter consisting of a diode 11a and a capacitor 12a and an output of a low-pass filter consisting of a diode 11b and a capacitor 12b are equal with each other and, therefore, an output of the operational amplifier 13 becomes a LOW level. A reference numeral 10 represents an oscillator which causes approximately 2 MHz oscillation. When the coil 10a directly confront the salient poles 3a, 3b, —, an impedance is reduced due to iron loss. Therefore, a voltage drop in the resistor 15a becomes large and therefore the output of the operational amplifier 13 becomes a HIGH level.

Figure 25:
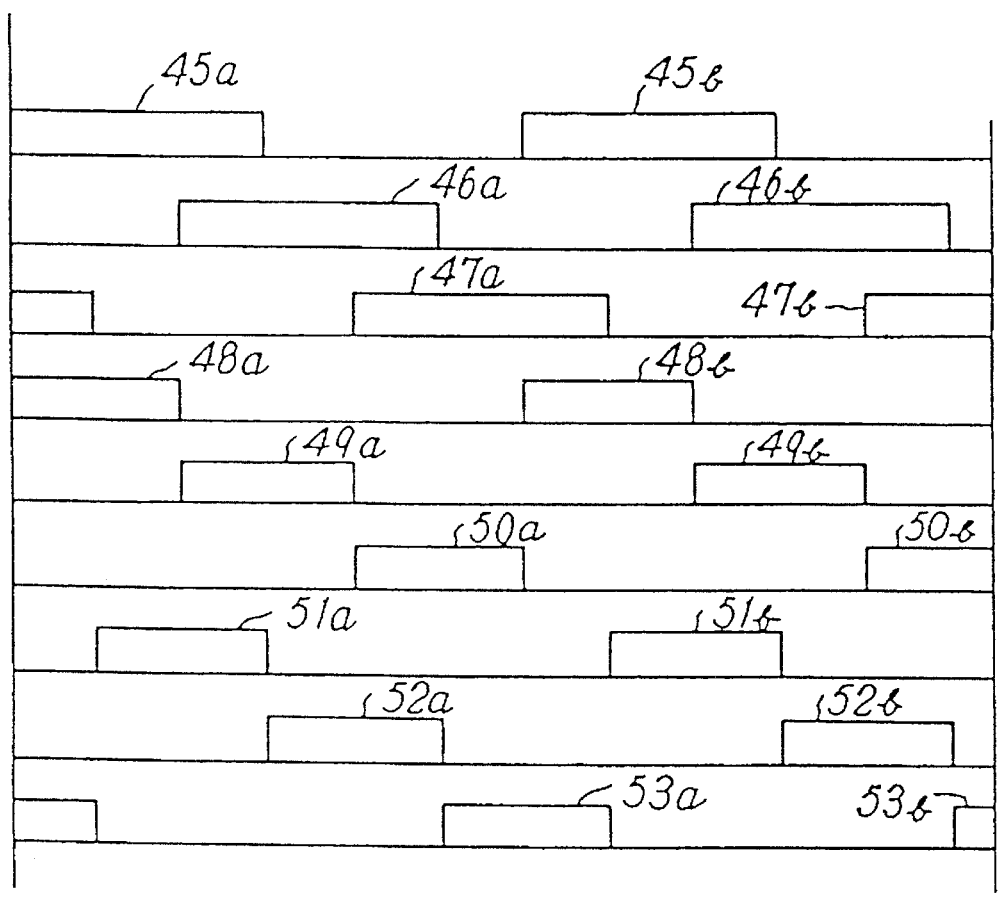
FIG. 25 is a time chart showing position detecting signal curves of the three-phase reluctance type motor.

Inputs to the block circuit 18 are shown by curves 45a, 45b, —in a time chart of FIG. 25, and inputs supplied through an inversion circuit 13a are identical with inverted curves of these curves 45a, 45b, —. Block circuits 14a, 14b in FIG. 6 include the coils 10b and 10c, respectively, and have the same constitution as the above-described block circuit.

The oscillator 10 can be utilized commonly among these block circuits. An output of the block circuit 14a and an output of the inversion circuit 13b are inputted into the block circuit 18, and their output signals become curves 46a, 46b, —and the inverted curves of these curves 46a, 46b, —, as shown in FIG. 25.

An output of the block circuit 14b and an output of the inversion circuit 13c are inputted into the block circuit 18, and their output signals become curves 47a, 47b, —and the inverted curves of these curves 47a, 47b, as shown in FIG. 25. The curves 46a, 46b, —are delayed 120 degrees in their phase with respect to the curves 45a, 45b, —. In the same way, the curves 47a, 47b, —are delayed 120 degrees in their phase with respect to the curves 46a, 46b, —. The block circuit 18 is a circuit conventionally utilized in a control circuit of a three-phase Y-type semiconductor motor. That is, the block circuit 18 is a logic circuit generating 120-degree width rectangular-waveform electric signals from terminals 18a, 18b, —, 18f in response to the above-described position detecting signals. Outputs from the terminals 18a, 18b and 18c are shown by curves 48a, 48b, —, curves 49a, 49b, —, and curves 50a, 50b, —in FIG. 25, respectively. Outputs from the terminals 18d, 18e and 18f are shown by curves 51a, 51b, —, curves 52a, 52b, —, and curves 53a, 53b, —in FIG. 25, respectively. Using the upper three signals of the time chart, the lower six signals can be obtained. For example, to obtain the curves 51a, 51b, —, the following means is adopted. An AND circuit having two inputs of the curves 45a, 45b, —and the inverted curves of these curves 45a, 45b, —produces the output of the curves 51a, 51b, —.

Phase difference of the output signals between the terminals 18a and 18d, between the terminals 18b and 18e, and between the terminals 18c and 18f is 60 degrees. Output signals of the terminals 18a, 18b and 18c are successively delayed 120 degrees from one another, and output signals of the terminals 18d, 18e and 18f are successively delayed 120 degrees from one another, similarly.

Next, the current supply control means of the armature coils will be explained with reference to FIG. 8. Both ends of the armature coils 39a, 39b and 39c are connected with transistors 20a, 20b and 20c, 20d and 20e, 20f. The transistors 20a, 20b, 20c, —serve as switching elements and can be substituted by other semiconductor elements having the same effect. A DC electric power source supplies electric power from its positive and negative terminals 2a, 2b. When a downside input of the AND circuit 41a is a HIGH level, the transistors 20a, 20b are turned on in response to a HIGH-level signal from the terminal 42a. Thus, the armature coil 39a is activated. In the same way, when HIGH-level signals are inputted from the terminals 42b, 42c, the transistors 20c, 20d and the transistors 20e, 20f are turned on to activate the armature coils 39b, 39c, respectively. A terminal 40 is supplied with a reference voltage specifying an exciting current. By changing a voltage of the terminal 40, an output torque can be changed. When an electric power switch (not shown) is turned on, an output of an operational amplifier 40b becomes a HIGH level since an input of a negative terminal of the operational amplifier 40b is lower than that of its positive terminal. Accordingly, the transistors 20a, 20b turn on to apply a voltage to the current supply control circuit of the armature coil 39a. A resistor 22a is provided for detecting exciting current flowing through the armature coil 39a. A reference numeral 30a represents an absolute-value circuit.

Position detecting signals 48a, 48b, —of FIG. 25 show the input signal from the terminal 42a. Position detecting signals 49a, 49b, —and 50a, 50b, —show the input signals from the terminals 42b and 42c. One of the above-described position detecting signal curves is shown as a curve 48a in the upper part of a time chart of FIG. 23. The armature coil 39a is supplied with an exciting current during a time period corresponding to this curve 48a. An arrow 23a shows a current supply angle of 120 degrees. In an initial stage of the current supply period, building-up of the exciting current is delayed due to inductance of the armature coil itself. If the current is stopped, magnetic energy stored in the armature coil is discharged to the electric power source through diodes 21a, 21b if the diode 49a-1 of FIG. 8 is omitted. Therefore, the current decreases as shown by a second half portion of the curve 25; i.e. a right side of the dotted line K-1. A section where positive torque is generated is a 180-degree section shown by an arrow 23, so that counter torque which acts to decrease output torque and efficiency is generated. This phenomenon becomes remarkable as the speed increases. It is therefore feared that the motor cannot be practically used in a high-speed region.

This is because a time width of the positive torque generating section 23 becomes small in proportion to an increase of the rotational speed, while a time width of the counter torque generating section does not vary even if the motor speed becomes a high speed.

The same explanation is applied to the current supply operation of the armature coils 39b, 39c based on other position detecting signals 49a, 50a. Since a building-up portion of the curve 25 is also delayed, an output torque is decreased. That is, torque reduction occurs. This is because the magnetic poles and the salient poles interact to close the magnetic path so as to have a large inductance. Although the reluctance type motor has a disadvantage in that it cannot increase its rotational speed notwithstanding an advantage of large output torque, such a disadvantage derives from the above-described counter torque and torque reduction. According to a conventional means for resolving such disadvantages, the current supply timing is advanced before the salient poles begin to confront the magnetic poles, and then activation of the armature coil is started.

Advancing the current supply timing makes an exciting current build up quickly because of small inductance of the magnetic poles. However, inductance abruptly increases when an output torque begins arising, i.e. when the salient poles begin confronting the magnetic poles. Hence, the exciting current declines steeply, so that the output torque reduces. In the case where a motor is driven in both forward and reverse directions, position detecting elements will be required twice in number. An apparatus in accordance with the present invention is characterized in that the above-mentioned disadvantage is eliminated by additionally providing back-flow preventing diodes 49a-1, 49b-1, 49c-1, and capacitors 47a, 47b, 47c shown in FIG. 8. When the current is stopped at the terminal end of the curve 48a, magnetic energy stored in the armature coil 39a is discharged through the diodes 21b, 21a to the capacitor 47a so as to charge it up to a high voltage with polarities shown in the drawing, being prevented from returning to the DC electric power source side by the function of the back-flow preventing diode 49a-1. Accordingly, the magnetic energy is sharply extinguished and the current decreases steeply.

Figure 23:
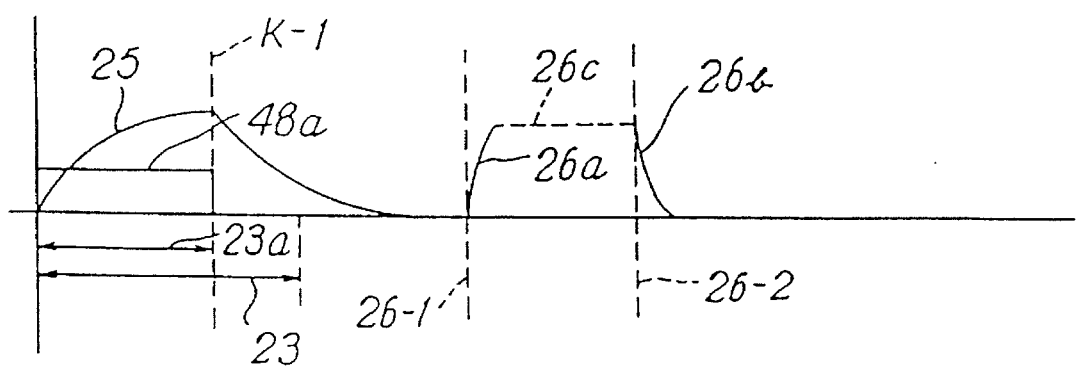
FIG. 23 is a graph showing a position detecting signal and the corresponding torque.

Curves 26a, 26b and 26c shown in the upper part of the time chart of FIG. 23 cooperatively represent a curve of current flowing in the armature coil 39a. Both dotted lines 26-1, 26-2 are spaced 120 degrees. The armature current decreases steeply like the curve 26b and therefore no counter torque is generated. The capacitor 47a is charged up to a high voltage and held at this voltage. Next, in response to the position detecting signal of curve 48b, the transistors 20a, 20b are turned on to activate the armature coil 39a again. A voltage equivalent to a summation of the charged voltage of the capacitor 47a and the DC electric power source voltage (a voltage between the terminals 2a, 2b) is applied to the armature coil 39a in this case; therefore, the exciting current of the armature coil 39a builds up sharply.

By virtue of this phenomenon, the exciting current builds up sharply as shown by the curve 26a. As is explained above, the torque reduction and the counter torque are removed. And, as the armature current becomes substantially the rectangular waveform, an output torque is increased.

Next, a chopper circuit will be explained. When the exciting current of the armature coil 39a increases and therefore the voltage drop in the resistor 22a, which detects the armature current value, increases to exceed the reference voltage of the reference voltage terminal 40 (i.e. an input voltage of the positive terminal of the operational amplifier 40b), a downside input of the AND circuit 41a becomes a LOW level. Thus, the transistors 20a, 20b are turned off and the exciting current is decreased. Due to hysteresis characteristics of the operational amplifier 40b, the output of the operational amplifier 40b returns to a HIGH level by a decrease of a predetermined amount. The transistors 20a and 20b, then, turn on to increase the exciting current. By repeating such a cycle, the exciting current is maintained at a predetermined value. A section indicated by the curve 26c of FIG. 23 is a section where chopper control is carried out. The height of the curve 26c is regulated by the voltage of the reference voltage terminal 40. The armature coil 39b of FIG. 8 is activated by the transistors 20c, 20d which are turned on in response to position detecting signal curves 49a, 49b, —supplied from the terminal 42b. A chopper control is carried out by the operational amplifier 40c, resistor 22b, absolute-value circuit 30b, and AND circuit 41b. Functions and effects of the diode 49b-1 and the capacitor 47b are the same as those for the armature coil 39a. The same explanation will be applied to the armature coil 39c. The armature coil 39c is activated in response to the position detecting signals of curves 50a, 50b, —of FIG. 25 supplied from the terminal 42c. Functions and effects of the transistors 20e, 20f, AND circuit 41c, operational amplifier 40d, resistor 22c, absolute-value circuit 30c, diode 49c-1 and capacitor 47c are the same as in previously explained case.

Current supply to each armature coil can be initiated either when the salient poles come to confront the magnetic poles or slightly before that. Such an adjustment of current supply is carried out by taking account of rotational speed, efficiency and output torque, and the positions to be fixed to the armature side of the detecting coils 10a, 10b and 10c, which serves as position detecting elements, is changed. As is apparent from the foregoing description, it becomes possible to drive a motor at a high speed with good efficiency and large output as a three-phase half-wave current supply mode motor. Thus, one of purposes of the present invention can be accomplished. However, as the output torque contains a large ripple, a problem may arise depending on the purpose of usage. The present invention is characterized by a three-phase full-wave current supply mode motor capable of solving the above-described problem.

Figure 24:
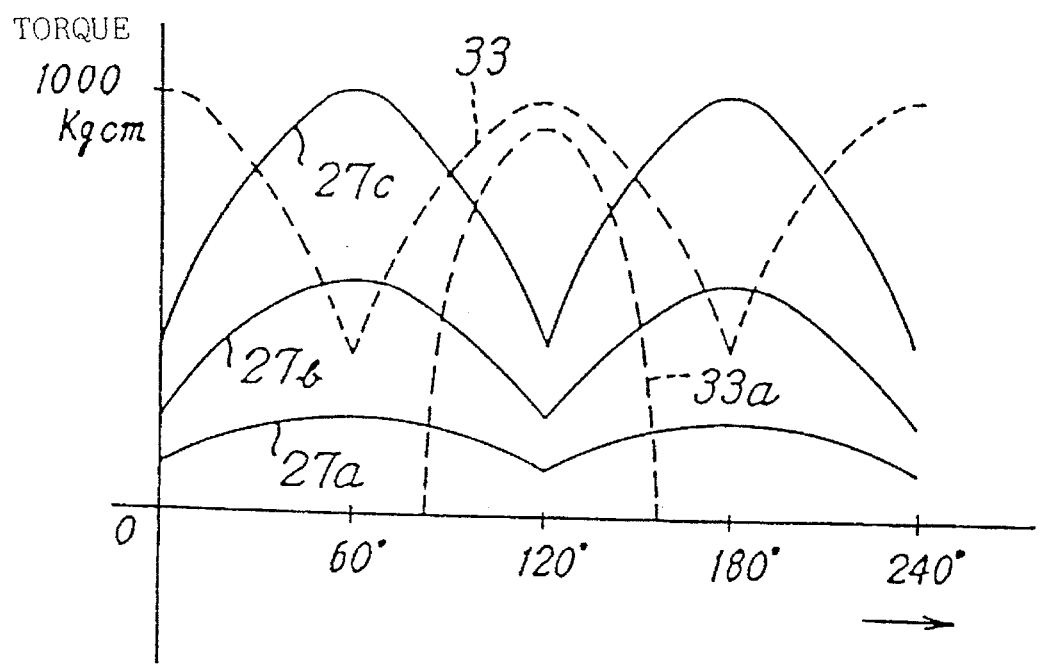
FIG. 24 is a graph showing output torque curves of the three-phase reluctance type motor.

FIG. 24 shows torque curves in the three-phase half-wave current supply mode motor, in which the abscissa represents the rotational angle of the rotor and the ordinate represents the output torque. Curves 27a, 27b and 27c represents output torques corresponding to 1, 1.5 and 2 amperes, respectively. A diameter of the rotor is 22 mm. An outer diameter of the fixed armature is 50 mm, and its length is also 50 mm. The abscissa is represented by the rotational angle. The ripple torque is approximately 70%. A bottom portion of the torque curve corresponds to the point where the tip of the salient pole enters into the slot. At the left edge of the curve 27c, i.e. at 0 degree, the output is small. Accordingly, if the salient pole is positioned at the above-explained point when the electric power is turned on, starting a motor will be difficult.

As later described with reference to FIG. 12, the above-described disadvantage is recognized in spite of a large output torque. Accordingly, the above-described disadvantage is removed by adding a device which enables to obtain an output torque indicated by the dot curve 33 or 33a using a three-phase full-wave current supply or other means. This is one of the purposes of the present invention.

FIG. 12 is a graph showing output torque curves, in which the abscissa represents the armature current and the ordinate represents the torque. This motor has the same construction as the one described above.

The initial part of the curve 43 is a curve of the second order and the remaining part of the curve 43 is a straight line. In a general motor, magnetic flux is saturated at the level of the dotted line 43a and an output torque not larger than the dotted line 43a is obtained. According to the apparatus of the present invention, the torque exceeding the level of the dotted line 43a increases linearly. Thus the output torque increases up to seven times as large as other same-type motors.

Addition of the torque indicated by the dotted line 33 of FIG. 25 can be realized by adding a three-phase half-wave current supply mode motor whose salient poles or slots are offset from one another by an angle of odd multiple of 60 degrees, in such a manner that the rotational shaft is commonly used. The means for realizing this will be explained next.

FIG. 5 is a cross-sectional view showing an overall constitution. In FIG. 5, a metallic outer casing (cylinder) 25-1 is coupled with an outer flange of a side plate 25-2 which is bent axially inward. Both side plates are formed with ball bearings 29a, 29b at the center thereof, through which a rotational shaft 5 is rotatably supported. A rotor 1 is fixed to the rotational shaft 5 through a supporting member 5-1. Salient poles (not shown) of the rotor 1 have substantially the same construction as the salient poles of the rotor 1 of FIG. 20. A fixed armature C, whose salient poles confront magnetic poles, is fixed to the inside of the outer casing 25-1. The construction of the fixed armature is substantially the same as the fixed armature 16 of FIGS. 20 and 21. Aluminum rotor 3, having a protrusion similar to the rotor 1 in outer peripheral shape, is fixed to the right surface of the rotor 1 so as to rotate together with the rotor 1. The outer peripheral portion faces the coils 10a, 10b and 10c which obtain position detecting signals shown in FIG. 25 as previously described with reference to FIG. 6.

The fixed armatures C and C-1 in phase with each other and fixed to the outer casing 25-1. The rotor 1 has the same construction as the rotor 1 and rotates synchronically with the rotor 1 with a mutual phase difference of 60 degrees with respect to the salient poles of the rotor 1 (equivalent to a 60-degree rotation about an axis). Magnetic poles of the fixed armatures C and C-1 confront salient poles on the outer periphery of the rotor over air gap. The magnetic poles of the fixed armature C-1 are associated with three-phase armature coils, which are referred to as armature coils 39d, 39e and 39f. The armature coils 39d, 39e and 39f are activated by an electric circuit similar to that of FIG. 8 in response to the position detecting signals 51a, 51b, —, 52a, 52b, —, 53a, 53b, —, of FIG. 25, so as to realize a three-phase half-wave current supply mode motor. The fixed armatures C and C-1 thus constitute a three-phase full-wave current supply mode motor.

The fixed armature C-1 described above is denoted by a reference numeral 16 in FIG. 21, while the rotor is denoted by a reference numeral 1 and its salient poles are denoted by reference numerals 1a, 1b, 1c, —. The salient poles 1a, 1b, 1c, —rotate synchronically with the salient poles 1a, 1b, 1c, —with a phase difference of 60 degrees. The same purpose will be accomplished by providing a phase difference of 60 degrees between the fixed armatures 16 and 16 while their salient poles are in phase. As the fixed armature 16 has the same construction as the fixed armature 16, the fixed armature 16 is illustrated by a dotted line. In the case where the number of the salient poles is not less than three, the fixed armature is elongated correspondingly to the right side of the dotted line B.

By executing the above-described three-phase full-wave current supply operation, the torque indicated by the curve 33 is added to each of the bottom portions of the output torque curve 27c of FIG. 24. Thus, a composite torque curve obtained is so flattened that the disadvantage is eliminated. A phase difference between the curves 27C and 33 is 60 degrees.

Next, other means for removing the ripple torque will be explained with reference to FIG. 22. The components identical with those of FIG. 21 in their function and effect are suffixed by the same reference numerals and therefore will no more explained. The different point is that the FIG. 22 embodiment is a three-phase half-wave current supply mode motor comprising only one armature 16 and only one rotor 1. The rotor 4, made of a magnetic member, is coaxial with the rotor 1 and rotates synchronically with the rotor 1. Salient poles 4a, 4b, —are provided so as to protrude from the outer surface of the rotor 4. Salient poles, each having a width of 48 degrees, are spaced 72 degrees from one another. The fixed armature 6 is coaxial with and fixed adjacent to the fixed armature 16 on the inside surface of the outer casing. Magnetic poles 6a and 6b protrude from the inside surface of the fixed armature 6 and confront the salient poles 4a, 4b, —over air gap. The fixed armature and the rotor 4 are made of laminated layers of silicon steel sheets. The magnetic poles 6a and 6b are wound by exciting coils 6-1 and 6-2, respectively, and have a polarity different from each other when magnetized. The magnetic poles 6a and 6b respectively has a width of 60 degrees, which is identical with the number of the salient poles 1a, 1b, —. It will be allowed to set it identical with the doubled number of the salient poles 1a and 1b.

In the same manner as in the previous embodiment, the present invention can be embodied by elongating the fixed armature to the right side of the dotted line B to increase the number of the salient poles 1a, 1b and increase the number of the salient poles 4a, 4b, —and the magnetic poles 6a, 6b. As described above, the output torque curve by the fixed armature 16 and the rotor 1 is the curve 27c shown in FIG. 24 which includes the ripple torque. The torque curve generated by the salient poles 4a, 4b, —of FIG. 22, which is indicated by the dotted line 33a, has a protruding portion at the position corresponding to the bottom portion of the curve 27c. Accordingly, it brings function and effect of flattening the output torque. In determining the mutual phase difference among the salient poles 1a, 1b, —, salient poles 4a, 4b, —, magnetic poles 6a, 6b and the fixed armature 16 of FIG. 22, it is necessary to satisfy the conditions for removing the above-described ripple torque. It is possible to dispose another two magnetic poles between the magnetic poles 6a and 6b. In this case, the peak value of the torque indicated by the curve 33a of FIG. 24 is enlarged, thereby reducing the length of the magnetic poles 6a and 6b to approximately ½ in the direction of the rotational axis. Accordingly, it produces the effect of reducing the length of the motor. For example, if the fixed armature C-1 of FIG. 5 is used as the fixed armature 6 of FIG. 22 and the rotor 1 is used as the rotor 4 of FIG. 22, the width of the arrow 29d will be reduced to approximately ½ of the width of arrow 29c. Thus, it becomes possible to shorten the length in the direction of the rotational shaft 5. By increasing ampere-turn of the exciting coils 6-1 and 6-2, the length of the motor will be further shortened.

With reference to FIG. 8, the current supply control means for activating the exciting coils 6-1 and 6-2 will be explained. In FIG. 8, the exciting coils 6-1 and 6-2 are connected in series or in parallel. Both ends of these exciting coils 6-1 and 6-2 are connected to transistors 20g, 20h and a diode 49-1. A resistor 22d, an absolute-value circuit 30d, an operational amplifier 40e, and a capacitor 47d have the same constitution as in the current supply control for the armature coils 39a, 39b and 39c previously described. Therefore, the same function and effect are given.

Figure 22:
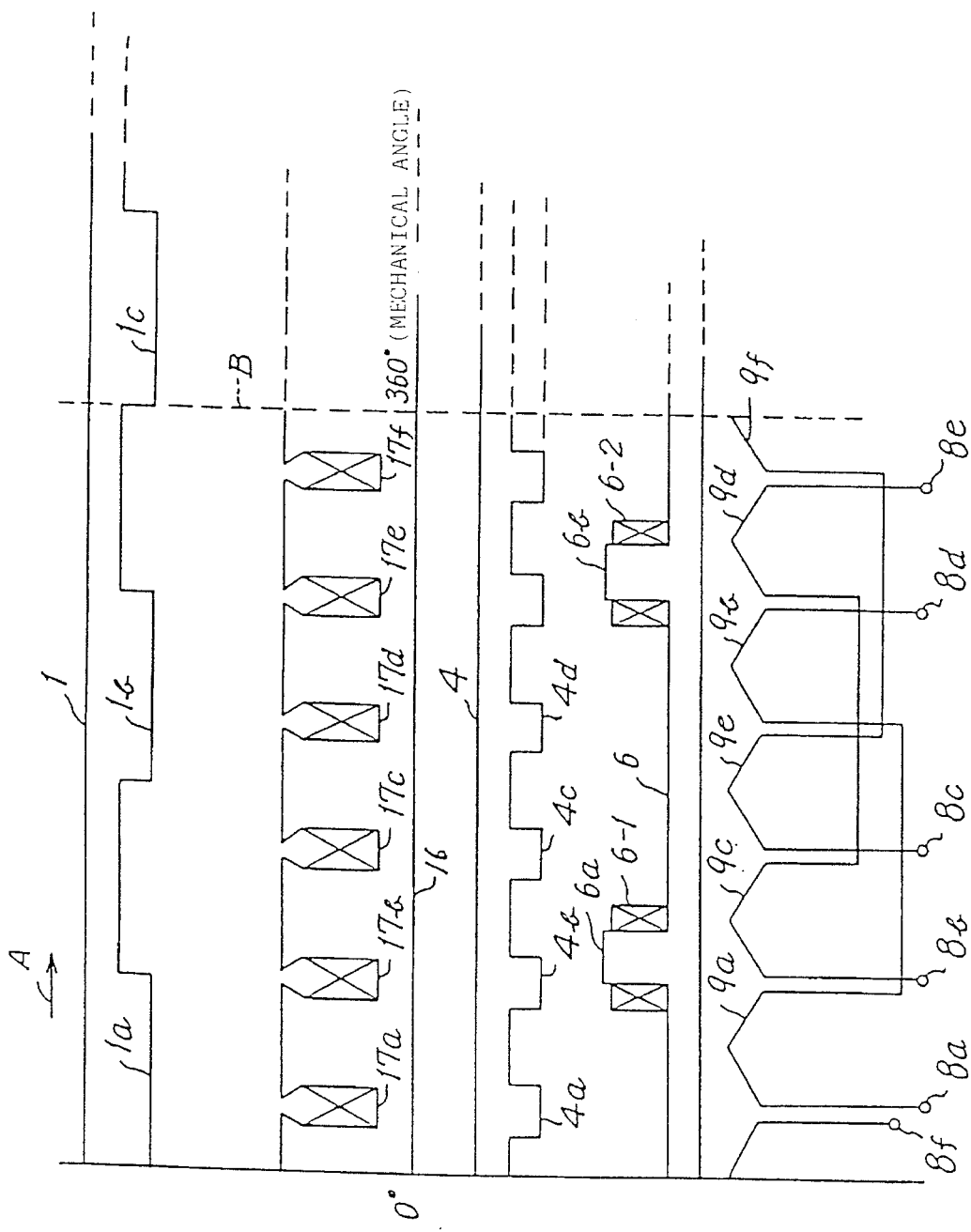
FIG. 22 is a development showing the rotor, fixed armature and armature coils of a three-phase reluctance type motor in accordance with other embodiment of the present invention.

The block circuit D represents a position detecting device for the salient poles 4a, 4b, —of FIG. 22. A position detecting coil 10d, having a small diameter, confronts the side surfaces of the salient poles 4a, 4b, —, so that its impedance is changed due to iron loss during the confronting of the salient poles. Therefore, the constitution is the same as the circuit of FIG. 6 and the width of an output of an operational amplifier corresponding to the operational amplifier 13 becomes identical with the width of the salient poles 4a, 4b, —. Its output becomes an input of the AND circuit 41d of FIG. 8. As the other input is an output of the operational amplifier 40e, the current supplied to the exciting coils 6-1 and 6-2 corresponds to the voltage of the reference voltage source 40. It is preferable to adjust the peak value of the torque curve generated by Such exciting current, i.e. the peak value of the dotted line 33a of FIG. 24, to be a value as can eliminate the concave portions of the curve 27c.

Although current supply control is carried out in FIG. 8 by two transistors which are provided at both end of each armature coils, the present invention can be embodied by providing only one transistor at a negative voltage side of each armature coil.

It will be explained with reference to FIG. 10.

In FIG. 10, downside ends of the armature coils 39a, 39b and 39c are connected with transistors 20a, 20b and 20c. The transistors 20a, 20b and 20c serve as semiconductor switching elements and can be substituted by other semiconductor elements having the same effect. A DC electric power source supplies electric power from its positive and negative terminals 2a, 2b. This embodiment is characterized by a simplified circuit configuration in which the transistor 20a, 20b or 20c is provided at a lower end of each armature coil, i.e. a negative terminal side of the DC electric power source.

Next, details of the current supply control circuit of the present invention for activating/deactivating armature coils based on the three-phase full-wave current supply mode explained in FIG. 21 will be explained with reference to FIG. 10.

In FIG. 10, position detecting signals inputted through the terminals 42a, 42b and 42c are represented by the curves 48a, 48b, —, curves 49a, 49b, —and curves 50a, 50b, —in FIG. 25. When an input is received through the terminal 42a, the transistor 20a is turned on through the AND circuit 41a to activate the armature coil 39a. Thereafter, by the chopper function of the resistor 22, absolute-value circuit 30a and operational amplifier 40b, the exciting current of the armature coil is controlled to be responsive to the reference voltage of the terminal 40.

When the input of the terminal 42a is extinguished, the transistor 20a is turned off and magnetic energy stored in the armature coil 39a is discharged through the diodes 21a, 33a into the capacitor 47a to charge it up to a high voltage. As the capacitor 47a is charged repeatedly by a small amount when chopper control is carried out as described above, the charged voltage of the capacitor 47a increases in response to the addition of the magnetic energy. The resultant charged voltage should be adjusted by taking account of the withstanding voltage of the transistors to be used.

When the transistor 20b is turned on in response to an input fed through the terminal 42b, current supply control is also carried out by chopper operation. When the transistor 20*b* is turned off, magnetic energy stored in the armature coil 39*b* is discharged through the diodes 21*b*, 33*b* into the capacitor 47*b* to charge it up to a high voltage.

When the transistor 20*c* is turned on in response to an input fed through the terminal 42*c*, current supply control is also carried out by chopper operation. When the transistor 20*c* is turned off, magnetic energy stored in the armature coil 39*c* is discharged through the diodes 21*c*, 33*c* into the capacitor 47*c* to charge it up to a high voltage.

As the transistors 34*b*, 34*a* and SCR 19*a* are turned on in response to an output signal of the block circuit 4 (a circuit including a monostable circuit responding to a differential pulse) in an initial stage of the input signal fed from the terminal 42*a*, high voltage of the capacitor 47*a* is applied to the armature coil 39*c*, thereby sharply building up the current. Electric pulses obtained in the initial stage of the input signals fed from the terminals 42*a*, 42*b* are respectively given to the terminals 19*d*, 19*e* through the similar means. Accordingly, high voltage of the capacitors 47*b*, 47*c* is applied to the armature coils 39*a*, 39*b*, thereby sharply building up the current.

As understood from the foregoing description, a highly efficient motor capable of rotating fast without counter torque and torque reduction can be obtained in the same manner as the previous embodiments.

The armature coils 39*d*, 39*e* and 39*f* represent No. 1-, No. 2- and No. 3-phase armature coils associated with the fixed armature 16 of FIG. 21. The block circuit 39 is the same electric circuit as that of the armature coils 39*a*, 39*b* and 39*c*, which controls current supplied to the armature coils 39*d*, 39*e* and 39*f* in response to the position detecting signals inputted through the terminals 42*d*, 42*e* and 42*f*.

As the input signals of the terminals 42*d*, 42*e* and 42*f* are curves 51*a*, 51*b*, —, curves 52*a*, 52*b*, —and curves 53*a*, 53*b*, —of FIG. 25, respectively, each corresponding armature coil is controlled by the three-phase half-wave current supply mode. Output torque by the armature coils 39*d*, 39*e* and 39*f* is delayed 60 degrees from the output torque by the armature coils 39*a*, 39*b* and 39*c*; therefore, it brings function and effect of eliminating the ripple torque as explained with reference to FIGS. 21 and 24.

The purpose of the present invention can be accomplished even if the width of the salient poles 1*a* and 1*b* of FIG. 21 is somewhere between 120 and 180 degrees.

In FIG. 8, if a changeover switch 40*a* is provided for selecting an output of the block circuit 40-1, the following effects will be obtained. The block circuit 40-1 is a well-known circuit which generates a predetermined output voltage when the rotational speed of the motor is a predetermined value, and maintains the rotational speed of the motor at the predetermined value by reducing or increasing the output voltage when the rotational speed is increased or decreased. Hence, it becomes possible to execute the constant-speed control.

What is claimed is:

1. A reluctance type motor in a three-phase full-wave reluctance type motor, comprising:

n first and second salient poles having the same width, equally spaced at regular angles and disposed at both ends of an outer peripheral surface of a magnetic rotor, where n is a positive integer not less than 2;

No. 1-, No. 2- and No. 3-phase armature coils wound around 6n slots, being successively offset with a phase difference of 120 degrees in terms of electric angle, said 6n slots being disposed on an inner peripheral surface of a cylindrical first fixed armature and equally spaced at regular angles;

a second fixed armature identical with said first fixed armature, having slots associated with No. 1-, No. 2- and No. 3-phase armature coils which are successively offset with a phase difference of 120 degrees in terms of electric angle;

means for offsetting position of the slots of said first and second fixed armatures, so that No. 1-, No. 2- and No. 3-phase armature coils are disposed with an offset electric angle of odd multiple of 30 degrees with respect to corresponding No. 1-, No. 2- and No. 3-phase armature coils, or said first and second salient poles opposing each other are disposed with a mutual offset electric angle of odd multiple of 30 degrees therebetween while said No. 1-, No. 2- and No. 3-phase armature coils and said No. 1-, No. 2- and No. 3-phase armature coils are in phase;

a position detecting device for detecting rotational position of said first salient pole and generating No. 1-phase position detecting signals having 120-degree width and mutually spaced at regular angles of 240 degrees in term of electric angle, No. 2-phase position detecting signals being delayed 120 degrees in terms of electric angle from said No. 1-phase position detecting signals, and No. 3-phase position detecting signals being delayed 120 degrees in terms of electric angle from said No. 2-phase position detecting signals, and further generating No. 1-, No. 2- and No. 3-phase position detecting signals delayed from said No. 1-, No. 2- and No. 3-phase position detecting signals by an electric angle of odd multiple of 30 degrees;

semiconductor switching elements connected in series with each of said No. 1-, No. 2-, No. 3-phase, No. 1-, No. 2- and No. 3-phase armature coils;

a DC electric power source supplying electric power to a serial joint unit consisting of said armature coil and said semiconductor switching element;

a current supply control circuit for supplying current to said No. 1-, No. 2-, No. 3-, No. 1-, No. 2- and No. 3-phase armature coils by turning on corresponding semiconductor switching elements connected in series with said No. 1-, No. 2-, No. 3-, No. 1-, No. 2- and No. 3-phase armature coils in response to said No. 1-, No. 2-, No. 3-, No. 1-, No. 2- and No. 3-phase position detecting signals by an amount of signal width of each position detecting signal;

a first electric circuit for transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal; and a second electric circuit for discharging electrostatic energy stored in said small-capacitance capacitor into an armature coil to be activated next upon activation of said next activated armature coil, when said magnetic rotor rotates a predetermined angle and said next activated armature coil is activated in response to the position detecting signal by an amount of signal width of said position detecting signal.

2. A reluctance type motor in a three-phase half-wave reluctance type motor, comprising:

n first salient poles having the same width, equally spaced at regular angles and disposed on an outer peripheral surface of a magnetic rotor, where n is a positive integer not less than 2;

6n second salient poles having the same width, equally spaced at regular angles and disposed on an outer peripheral surface of another magnetic rotor coaxial with and rotating synchronically with said magnetic rotor;

No. 1-, No. 2- and No. 3-phase armature coils wound around 6n slots, being successively offset with a phase difference of 120 degrees in terms of electric angle, said 6n slots being disposed on an inner peripheral surface of a cylindrical fixed armature and equally spaced at regular angles;

at least n magnetic poles having a predetermined width, equally spaced at regular angles and protruding from an inside surface of a cylindrical magnetic member disposed in parallel with said fixed armature, said magnetic poles being wound by exciting coils;

means for arranging said first and second salient poles to confront over slight air gap the inside peripheral surface of said fixed armature and said magnetic poles of the cylindrical magnetic member, respectively;

a position detecting device for detecting rotational position of said first salient pole and generating No. 1-phase position detecting signals having 120-degree width and mutually spaced at regular angles of 240 degrees in term of electric angle, No. 2-phase position detecting signals being delayed 120 degrees in terms of electric angle from said No. 1-phase position detecting signals, and No. 3-phase position detecting signals being delayed 120 degrees in terms of electric angle from said No. 2-phase position detecting signals;

semiconductor switching elements connected in series with each of said No. 1-, No. 2- and No. 3-phase armature coils and said exciting coils;

a DC electric power source supplying electric power to a serial joint unit consisting of said armature coil, said exciting coil and said semiconductor switching element;

a current supply control circuit for supplying current to said No. 1-, No. 2- and No. 3-phase armature coils by turning on corresponding semiconductor switching elements connected in series with said No. 1-, No. 2- and No. 3-phase armature coils in response to said No. 1-, No. 2- and No. 3-phase position detecting signals by an amount of signal width of each position detecting signal;

a first electric circuit for supplying current to said exciting coil in response to a position detecting signal obtained through detection of the position of said second salient pole, during a period from a point where said second salient pole begins entering an opposing magnetic pole to a point where both directly confront each other;

a second electric circuit for transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

an electric circuit for discharging electrostatic energy stored in said small-capacitance capacitor to an armature coil to be activated next upon activation of said next activated armature coil, when said magnetic rotor rotates a predetermined angle and said next activated armature coil is activated in response to the position detecting signal by an amount of signal width of said position detecting signal;

a current supply control circuit for maintaining current to be supplied to said exciting coil at a value corresponding to current to be supplied to said armature coil; and means for adjusting relative position of torque generating members so that a peak of ripple torque generated by said exciting coil is overlapped with a concave portion of ripple torque of an output torque generated by said armature coil when activated.

3. A reluctance type motor in a two-phase full-wave reluctance type motor, comprising:

n first salient poles having the same width, equally spaced at regular angles and disposed at both ends of an outer peripheral surface of a magnetic rotor, where n is a positive integer not less than 2;

4n second salient poles equally spaced at regular angles and disposed on an outer peripheral surface of another magnetic rotor coaxial with and rotating synchronically with said magnetic rotor;

No. 1-, No. 2-, No. 3- and No. 4-phase armature coils wound around 4n slots, being successively offset with a phase difference of 90 degrees in terms of electric angle, said 4n slots being disposed on an inner peripheral surface of a cylindrical fixed armature and equally spaced at regular angles;

at least n magnetic poles having a predetermined width, equally spaced at regular angles and protruding from an inside surface of a cylindrical magnetic member disposed in parallel with said fixed armature, said magnetic poles being wound by exciting coils;

means for arranging said first and second salient poles to confront over slight air gap with the inside peripheral surface of said fixed armature and said magnetic poles of the cylindrical magnetic member, respectively;

a position detecting device for detecting rotational position of said first salient pole and generating No. 1-, No. 2-, No. 3- and No. 4-phase position detecting signals having 90-degree width in terms of electric angle and continuous one another;

semiconductor switching elements connected in series with each of said No. 1-, No. 2-, No. 3- and No. 4-phase armature coils and said exciting coils;

a DC electric power source supplying electric power to a serial joint unit consisting of said armature coil, said exciting coil and said semiconductor switching element;

a current supply control circuit for supplying current to said No. 1-, No. 2-, No. 3- and No. 4-phase armature coils by turning on corresponding semiconductor switching elements connected in series with said No. 1-, No. 2-, No. 3- and No. 4-phase armature coils in response to said No. 1-, No. 2-, No. 3- and No. 4-phase position detecting signals by an amount of signal width of each position detecting signal;

a first electric circuit for supplying current to said exciting coil in response to a position detecting signal obtained through detection of the position of said second salient pole, during a period from a point where said second salient pole begins entering an opposing magnetic pole to a point where both directly confront each other;

a second electric circuit for transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

an electric circuit for discharging electrostatic energy stored in said small-capacitance capacitor to an armature coil to be activated next upon activation of said next activated armature coil, when said magnetic rotor rotates a predetermined angle and said next activated armature coil is activated in response to the position detecting signal by an amount of signal width of said position detecting signal;

a current supply control circuit for maintaining current to be supplied to said exciting coil at a value corresponding to current to be supplied to said armature coil; and means for adjusting relative position of torque generating members so that a peak of ripple torque generated by said exciting coil is overlapped with a concave portion of ripple torque of an output torque generated by said armature coil when activated.

4. A reluctance type motor in a three-phase full-wave reluctance type motor, comprising:

n first and second salient poles having the same width, equally spaced at regular angles and disposed at both ends of an outer peripheral surface of a magnetic rotor, where n is a positive integer not less than 2;

3n slots equally spaced at regular angles and disposed on an inner peripheral surface of a cylindrical first fixed armature;

No. 1-, No. 2- and No. 3-phase armature coils, each wound around adjacent two slots;

a second fixed armature identical with said first fixed armature, having slots associated with No. 1-, No. 2- and No. 3-phase armature coils which are successively offset with a phase difference of 120 degrees in terms of electric angle;

means for offsetting position of the slots of said first and second fixed armatures, so that No. 1-, No. 2- and No. 3-phase armature coils are disposed with an offset electric angle of odd multiple of 60 degrees with respect to corresponding No. 1-, No. 2- and No. 3-phase armature coils, or said first and second salient poles opposing with each other are disposed with an offset electric angle of odd multiple of 60 degrees therebetween while said No. 1-, No. 2- and No. 3-phase armature coils and said No. 1-, No. 2- and No. 3-phase armature coils are in phase;

a position detecting device for detecting rotational position of said first salient pole and generating No. 1-phase position detecting signals having 120-degree width and mutually spaced at regular angles of 240 degrees in term of electric angle, No. 2-phase position detecting signals being delayed 120 degrees in terms of electric angle from said No. 1-phase position detecting signals, and No. 3-phase position detecting signals being delayed 120 degrees in terms of electric angle from said No. 2-phase position detecting signals, and further generating No. 1-, No. 2- and No. 3-phase position detecting signals delayed from said No. 1-, No. 2- and No. 3-phase position detecting signals by an electric angle of odd multiple of 60 degrees;

semiconductor switching elements connected in series with each of said No. 1-, No. 2-, No. 3-phase, No. 1-, No. 2- and No. 3-phase armature coils;

a DC electric power source supplying electric power to a serial joint unit consisting of said armature coil and said semiconductor switching element;

a current supply control circuit for supplying current to said No. 1-, No. 2-, No. 3-, No. 1-, No. 2- and No. 3-phase armature coils by turning on corresponding semiconductor switching elements connected in series with said No. 1-, No. 2-, No. 3-, No. 1-, No. 2- and No. 3-phase armature coils in response to said No. 1-, No. 2-, No. 3-, No. 1-, No. 2- and No. 3-phase position detecting signals by an amount of signal width of each position detecting signal;

a first electric circuit for transferring magnetic energy stored in the armature coil through a diode to a small-capacitance capacitor from a connecting point of said semiconductor switching element and said armature coil and holding it to quickly reduce exciting current of said armature coil when said semiconductor switching element is turned off at a terminal end of said position detecting signal; and a second electric circuit for discharging electrostatic energy stored in said small-capacitance capacitor into an armature coil to be activated next upon activation of said next activated armature coil, when said magnetic rotor rotates a predetermined angle and said next activated armature coil is activated in response to the position detecting signal by an amount of signal width of said position detecting signal.

5. A three-phase reluctance type motor in a three-phase half-wave reluctance type motor, comprising:

n first salient poles having the same width, equally spaced at regular angles and disposed on an outer peripheral surface of a magnetic rotor, where n is a positive integer not less than 2;

3n second salient poles having the same width, equally spaced at regular angles and disposed on an outer peripheral surface of another magnetic rotor coaxial with and rotating in synchronism with said magnetic rotor;

3n slots being disposed on an inner peripheral surface of a cylindrical fixed armature and equally spaced at regular angles;

3n No. 1-, No. 2- and No. 3-phase armature coils wound around adjacent two slots;

at least n magnetic poles having a predetermined width, equally spaced at regular angles and protruding from an inside surface of a cylindrical magnetic member disposed in parallel with said fixed armature, said magnetic poles being wound by exciting coils;

means for arranging said first and second salient poles to confront over slight air gap the inside peripheral surface of said fixed armature and said magnetic poles of the cylindrical magnetic member, respectively;

a position detecting device for detecting rotational position of said first salient pole and generating No. 1-phase position detecting signals having 120-degree width and mutually spaced at regular angles of 240 degrees in term of electric angle, No. 2-phase position detecting signals being delayed 120 degrees in terms of electric angle from said No. 1-phase position detecting signals, and No. 3-phase position detecting signals being delayed 120 degrees in terms of electric angle from said No. 2-phase position detecting signals;

semiconductor switching elements connected in series with each of said No. 1-, No. 2- and No. 3-phase armature coils and said exciting coils;

a DC electric power source supplying electric power to a serial joint unit consisting of said armature coil; said exciting coil and said semiconductor switching element;

a current supply control circuit for supplying current to said No. 1-, No. 2- and No. 3-phase armature coils by turning on corresponding semiconductor switching elements connected in series with said No. 1-, No. 2- and No. 3-phase armature coils in response to said No. 1-, No. 2- and No. 3-phase position detecting signals by an amount of signal width of each position detecting signal;

a first electric circuit for supplying current to said exciting coil in response to a position detecting signal obtained through detection of the position of said second salient pole, during a period from a point where said second salient pole begins entering an opposing magnetic pole to a point where both directly confront each other;

a second electric circuit for transferring magnetic energy stored in the armature coil through a diode into a small-capacitance capacitor from a connecting point of said semiconductor switching element and said armature coil and holding it to quickly reduce exciting current of said armature coil when said semiconductor switching element is turned off at a terminal end of said position detecting signal;

an electric circuit for discharging electrostatic energy stored in said small-capacitance capacitor to an armature coil to be activated next upon activation of said next activated armature coil, when said magnetic rotor rotates a predetermined angle and said next activated armature coil is activated in response to the position detecting signal by an amount of signal width of said position detecting signal;

a current supply control circuit for maintaining current to be supplied to said exciting coil at a value corresponding to current to be supplied to said armature coil; and means for adjusting relative position of torque generating members so that a peak of ripple torque generated by said exciting coil is overlapped with a concave portion of ripple torque of an output torque generated by said armature coil when activated.

* * * * *